United States Patent
Abo-Hammour

(10) Patent No.: US 10,407,627 B2
(45) Date of Patent: Sep. 10, 2019

(54) METHOD AND APPARATUS FOR MAGNETIC/ELECTROSTATIC/ELECTRO-MAGNETIC TREATMENT OF FLUIDS COMPRISING THREE PHASES: THE TREATMENT PHASE, THE MIXING PHASE, AND THE USAGE PHASE WHICH ARE SPATIALLY AND TEMPORALLY DECOUPLED

(71) Applicant: PROFESSIONALS FOR ENERGY—ENVIRONMENT AND WATER SOLUTIONS LTD. CO., Amman (JO)

(72) Inventor: Zaer Abo-Hammour, Amman (JO)

(73) Assignee: PROFESSIONALS FOR ENERGY—ENVIRONMENT AND WATER SOLUTIONS LTD. CO., Amman (JO)

( * ) Notice: Subject to any disclaimer, the term of this patent is extended or adjusted under 35 U.S.C. 154(b) by 708 days.

(21) Appl. No.: 14/783,191

(22) PCT Filed: Apr. 7, 2014

(86) PCT No.: PCT/EP2014/056934
§ 371 (c)(1),
(2) Date: Oct. 8, 2015

(87) PCT Pub. No.: WO2014/173672
PCT Pub. Date: Oct. 30, 2014

(65) Prior Publication Data
US 2016/0046875 A1    Feb. 18, 2016

Related U.S. Application Data

(60) Provisional application No. 61/809,650, filed on Apr. 8, 2013.

(51) Int. Cl.
    C02F 1/48    (2006.01)
    C10L 1/06    (2006.01)
    (Continued)

(52) U.S. Cl.
    CPC .............. *C10G 32/02* (2013.01); *C02F 1/481* (2013.01); *C02F 1/484* (2013.01); *C10G 33/02* (2013.01);
    (Continued)

(58) Field of Classification Search
    CPC .......... C10G 32/02; C10G 33/02; C10L 1/06; C10L 1/08; C10L 10/02; C10L 2270/023;
    (Continued)

(56) References Cited

U.S. PATENT DOCUMENTS 4,113,589 A * 9/1978 Leach .................. B01J 19/121
                                                      204/157.5
4,734,202 A     3/1988 Mach
(Continued)

FOREIGN PATENT DOCUMENTS

| KR | 10-2008-0024055 A | 3/2008 |
| WO | 92/16460 A1 | 10/1992 |
| WO | 2012/156464 A2 | 11/2012 |

OTHER PUBLICATIONS

International Search Report of PCT/EP2014/056934, dated Sep. 22, 2014. [PCT/ISA/210].

*Primary Examiner* — Nicholas A Smith
*Assistant Examiner* — Colleen M Raphael
(74) *Attorney, Agent, or Firm* — Sughrue Mion, PLLC

(57) ABSTRACT

A method for magnetic/electrostatic/electromagnetic treatment of fluids consisting of three separate phases that are spatially and temporally decoupled. In the first phase, a magnetic/electrostatic/electromagnetic field is applied to a working fluid under circulation to obtain the directly ionized
(Continued)

an exemplary production process of the directly ionized or treated fluid using inline pre-treatment and post-treatment sensors configuration.

fluid. In the second phase, the directly ionized fluid is used as an ionizer or an ionizing agent for ionizing indirectly the normal non-ionized fluid by mixing the directly ionized fluid and normal non-ionized fluid in accordance with a predetermined mixing ratio and mixing method between the directly ionized fluid and normal non-ionized fluid. In the third phase, the resultant mixed or indirectly-ionized fluid is used in the proper application directly or stored in a storage tank for later use.

38 Claims, 10 Drawing Sheets

(51) Int. Cl.
*C10L 1/08* (2006.01)
*C10G 32/02* (2006.01)
*C10G 33/02* (2006.01)
*C10L 10/02* (2006.01)

(52) U.S. Cl.
CPC .................................. *C10L 1/06* (2013.01); *C10L 1/08* (2013.01); *C10L 10/02* (2013.01); *C10L 2200/0423* (2013.01); *C10L 2200/0446* (2013.01); *C10L 2230/22* (2013.01); *C10L 2270/023* (2013.01); *C10L 2270/026* (2013.01); *C10L 2290/24* (2013.01); *C10L 2290/38* (2013.01); *C10L 2290/40* (2013.01); *C10L 2290/58* (2013.01); *C10L 2290/60* (2013.01)

(58) Field of Classification Search
CPC ............. C10L 2230/22; C10L 2290/24; C10L 2290/38; C10L 2290/40; C10L 2290/58; C10L 2200/0423; C10L 2200/0446; C10L 2290/60; C10L 2270/026; C02F 1/481; C02F 1/484
USPC .................................. 204/156; 422/186–187
See application file for complete search history.

(56) References Cited

U.S. PATENT DOCUMENTS

| | | | |
|---|---|---|---|
| 5,217,607 A | 6/1993 | Dalton, III et al. | |
| 5,534,156 A | 7/1996 | Sanderson | |
| 5,591,317 A | 1/1997 | Pitts, Jr. | |
| 6,200,466 B1* | 3/2001 | Bender | A61L 2/088 422/186.3 |
| 7,381,382 B2* | 6/2008 | Rabinovich | B01J 19/088 422/186.04 |
| 2005/0142048 A1* | 6/2005 | Parsa | B01D 53/323 422/186.04 |
| 2011/0257788 A1* | 10/2011 | Wiemers | C02F 1/20 700/267 |
| 2012/0055285 A1* | 3/2012 | Mercuri | B01J 19/26 422/187 |
| 2012/0305383 A1 | 12/2012 | Sorokin | |

* cited by examiner

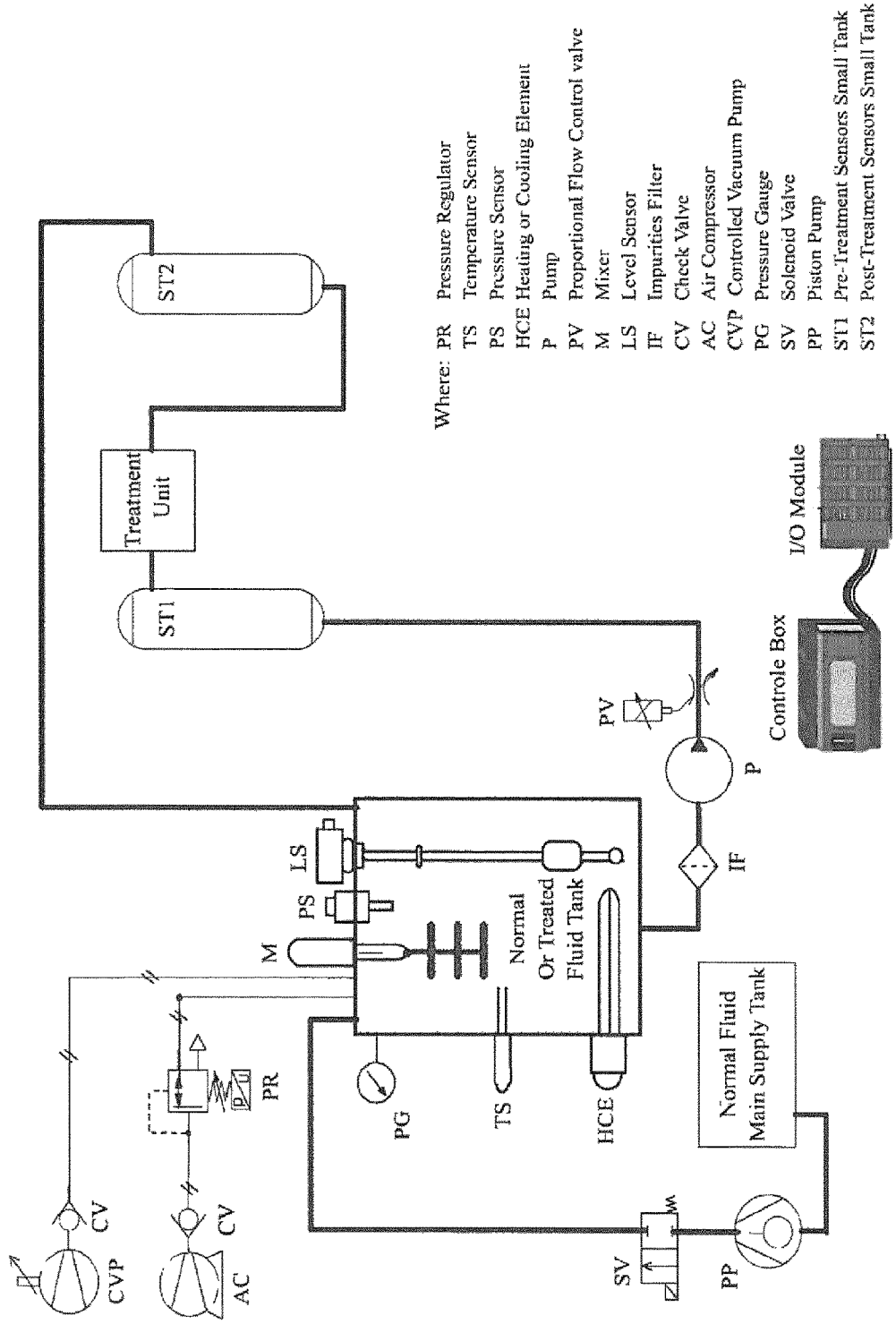
Figure 1: an exemplary production process of the directly ionized or treated fluid using inline pre-treatment and post-treatment sensors configuration.

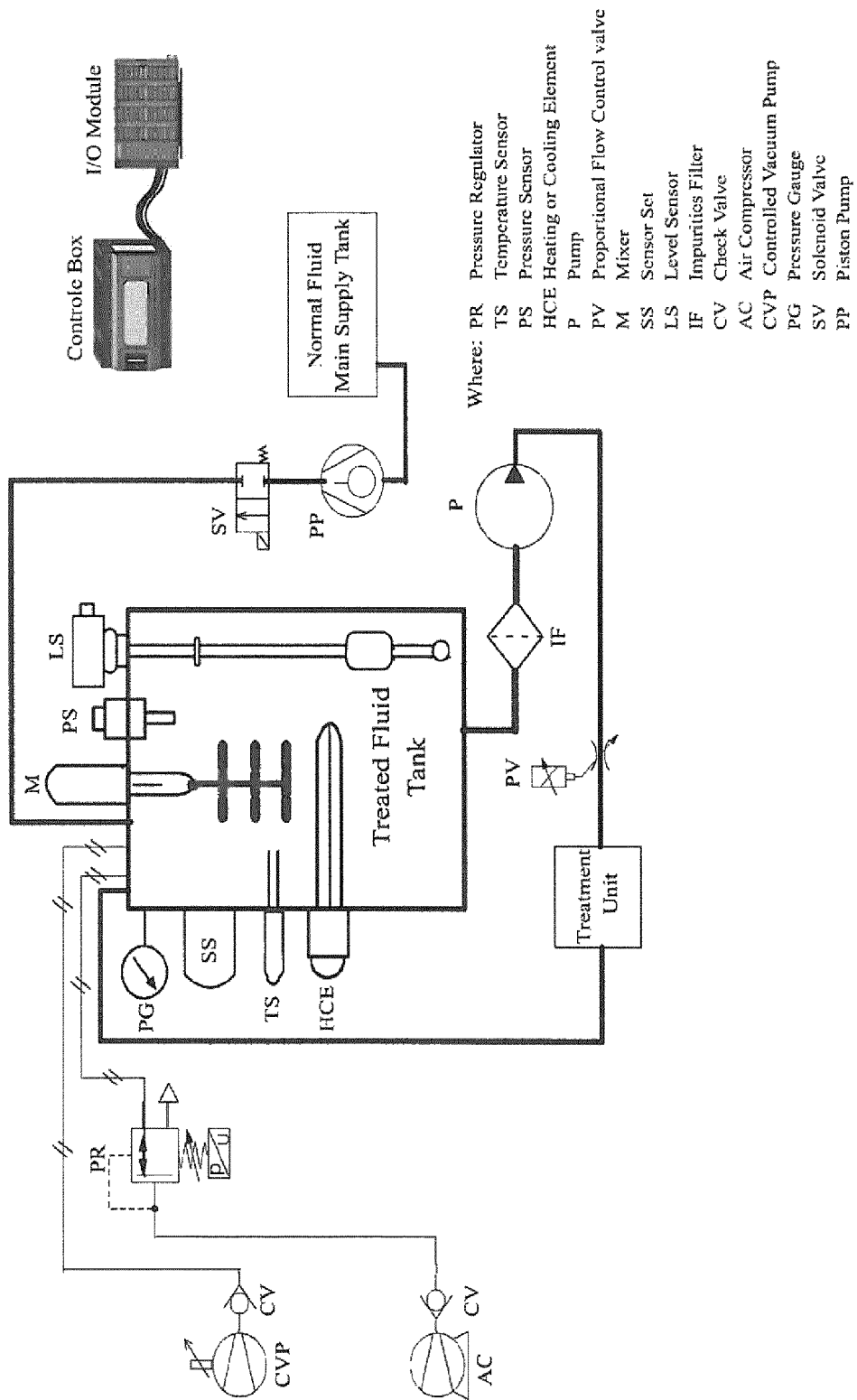
Figure 2: an exemplary production process of the directly ionized or treated fluid using in-tank sensors configuration

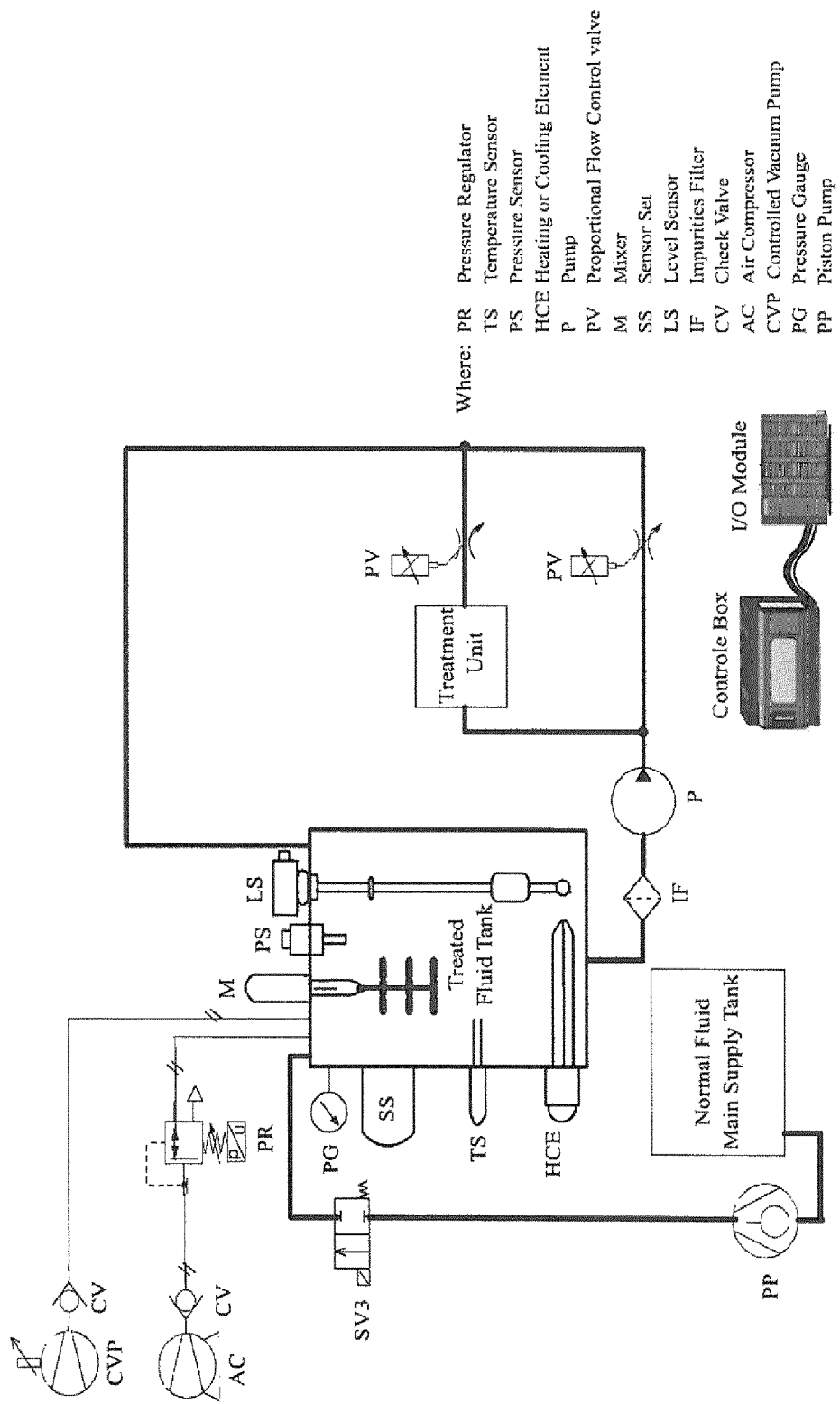
Figure 3: an exemplary production process of the directly ionized or treated fluid using parallel flow configuration

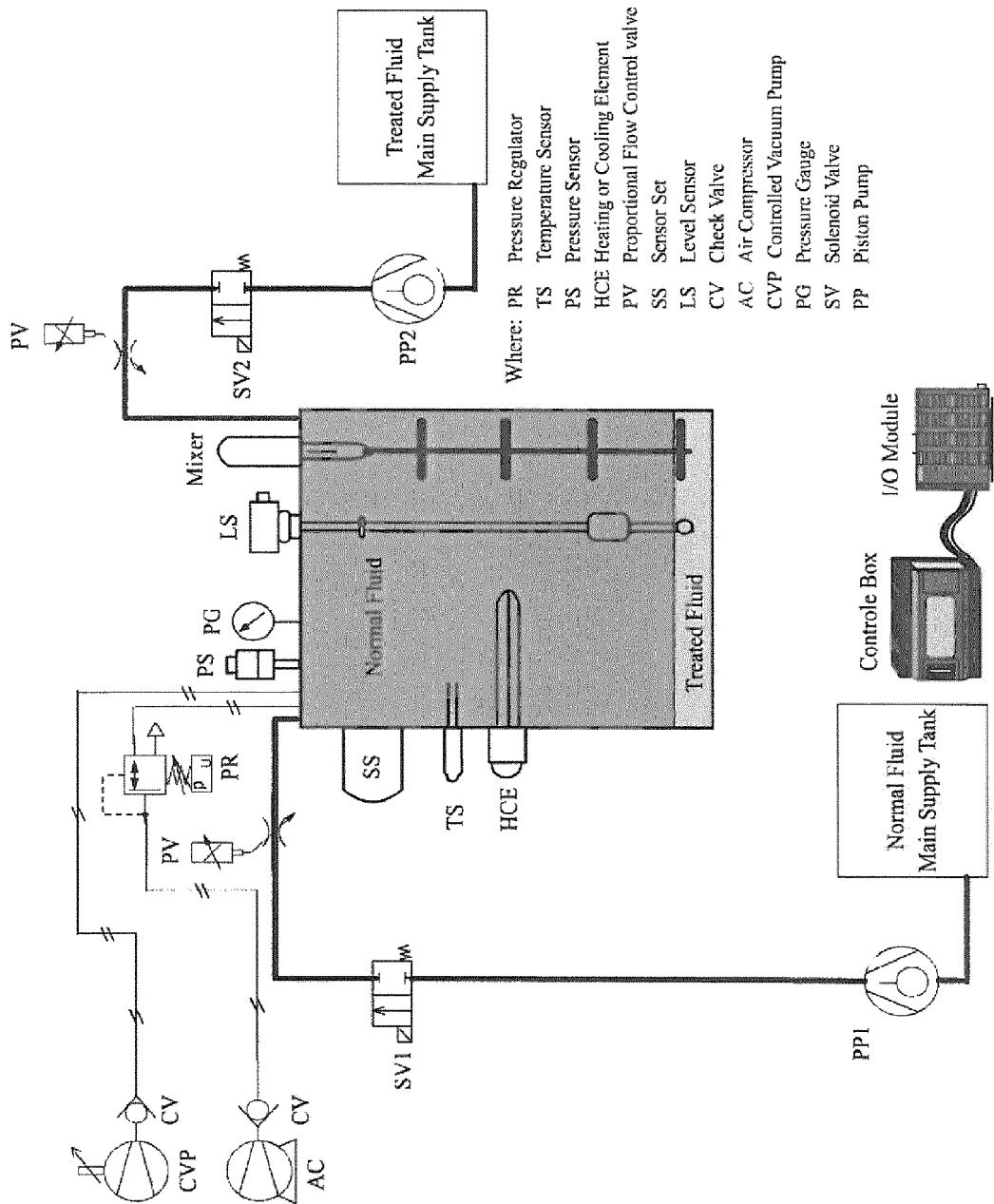
Figure 4: an exemplary mixing process using bottom configuration

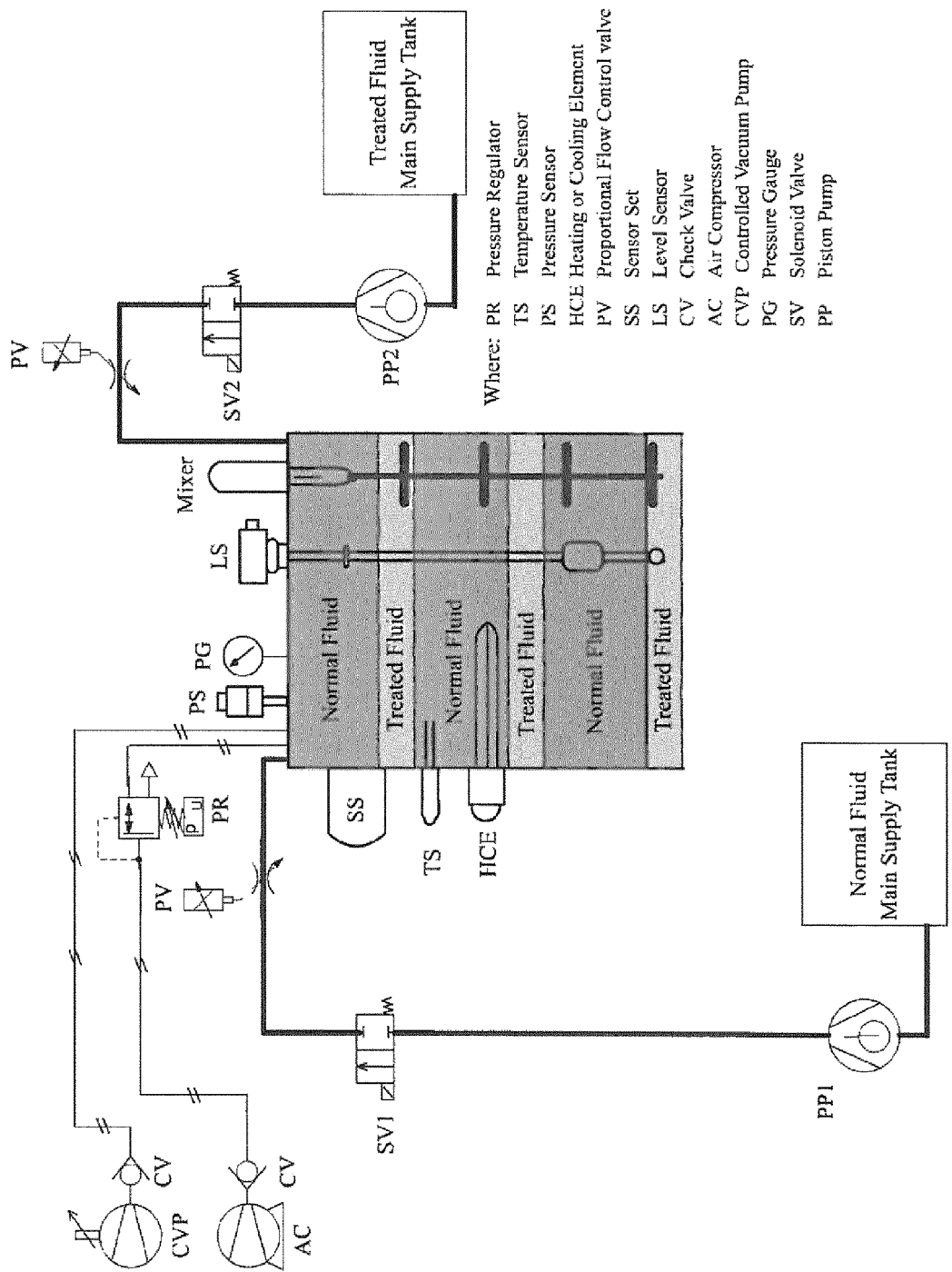
Figure 5: an exemplary mixing process using alternative bottom configuration

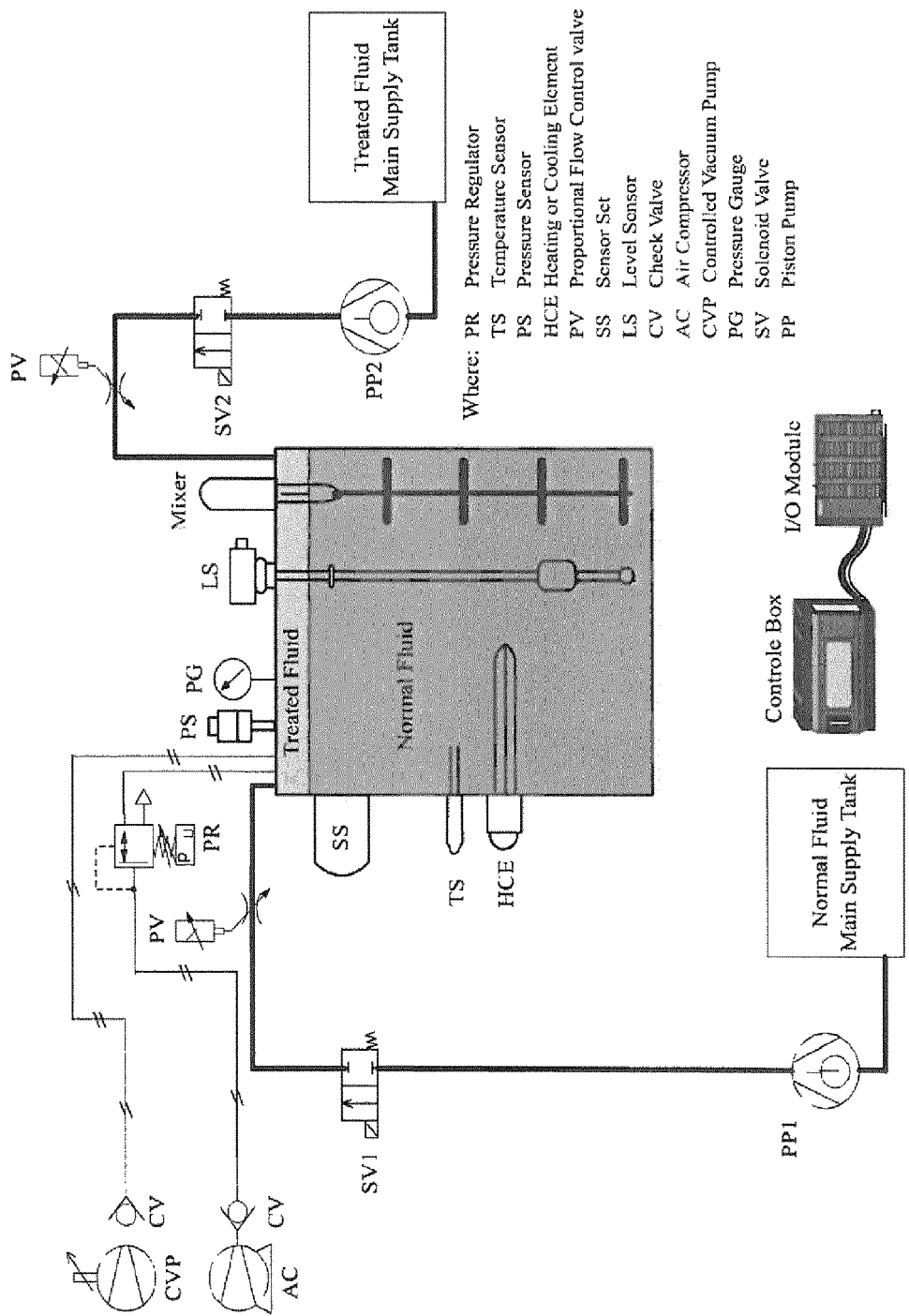
Figure 6: an exemplary mixing process using top configuration

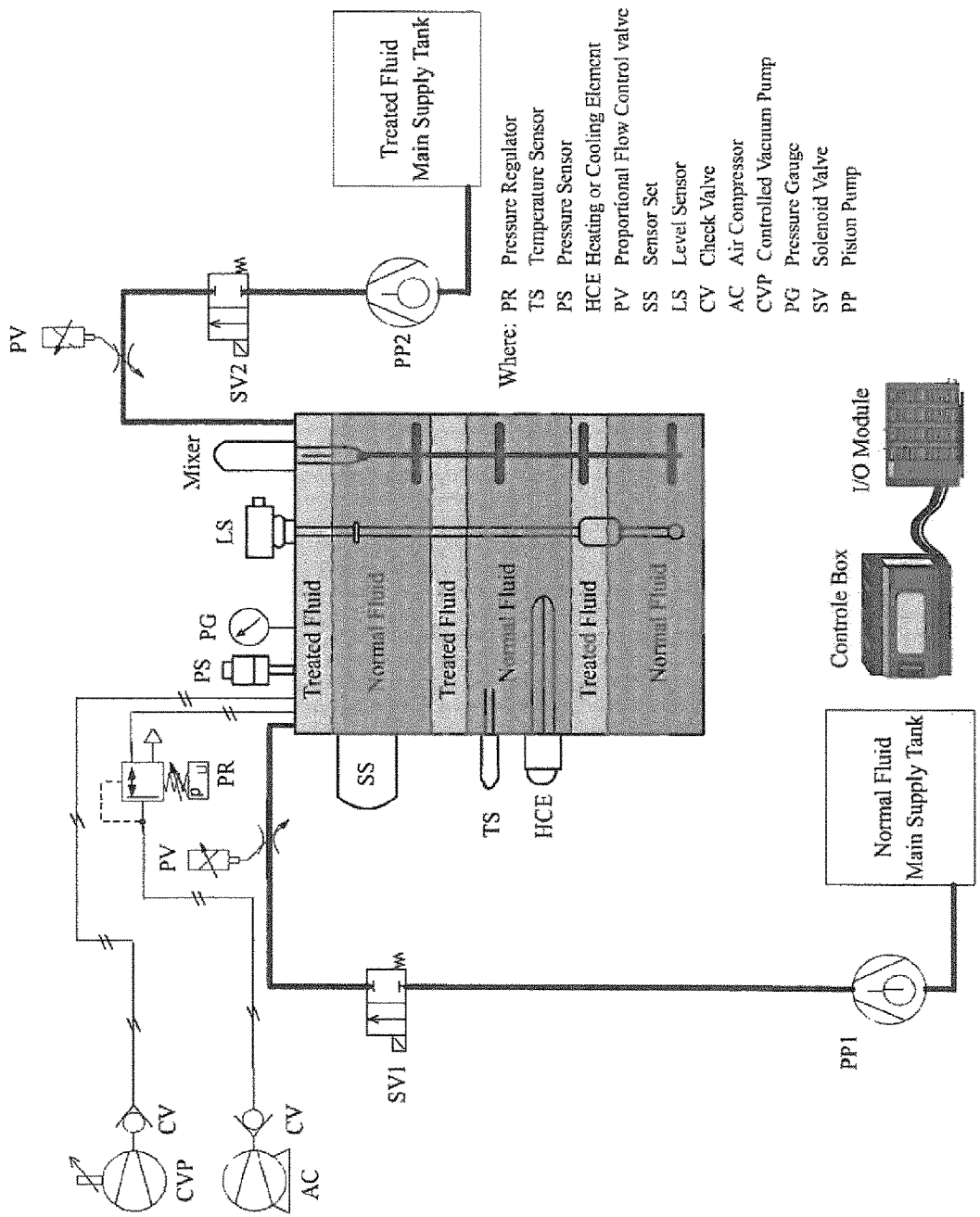
Figure 7: an exemplary mixing process using alternative top configuration

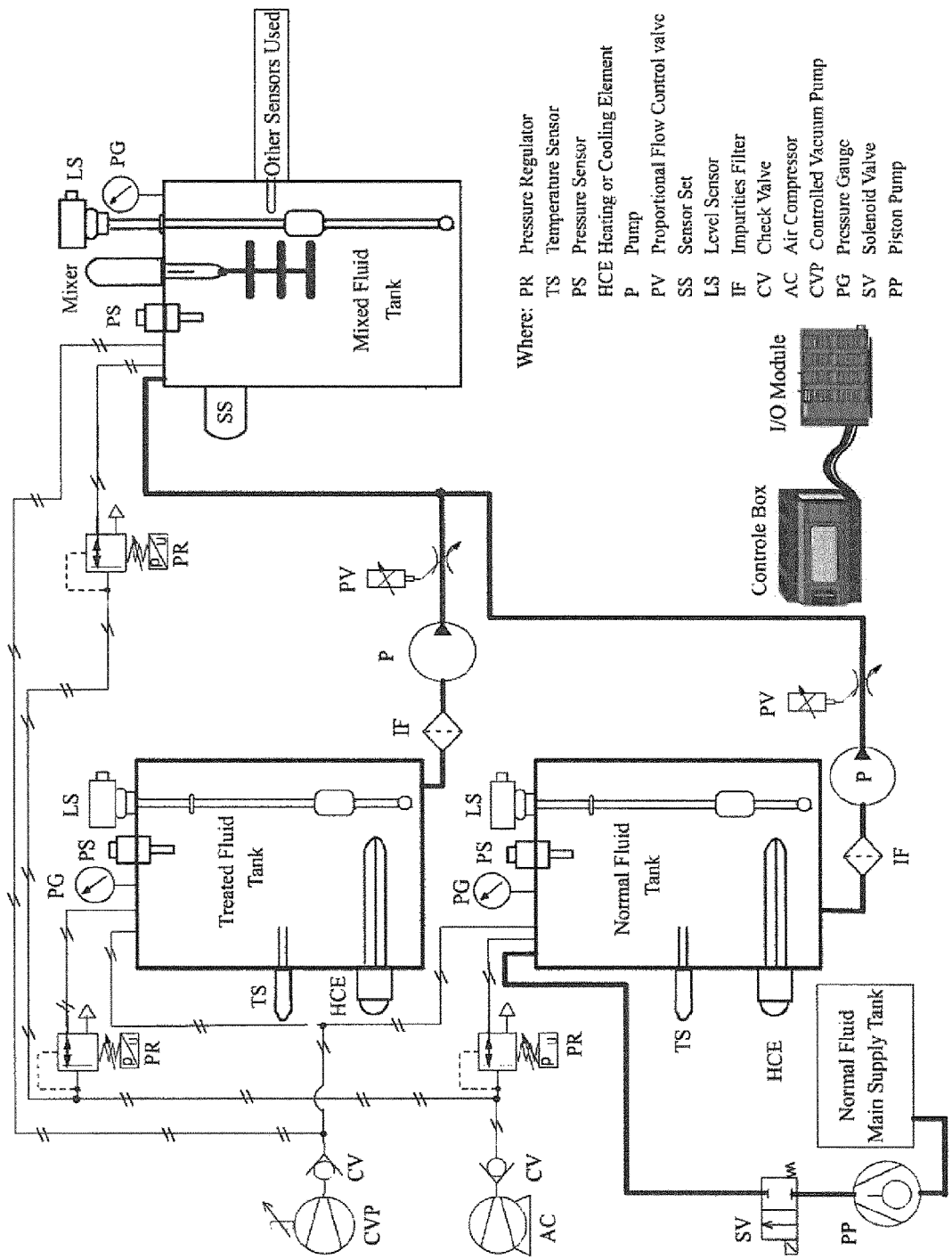
Figure 8: an exemplary mixing process using parallel flow two-tank configuration

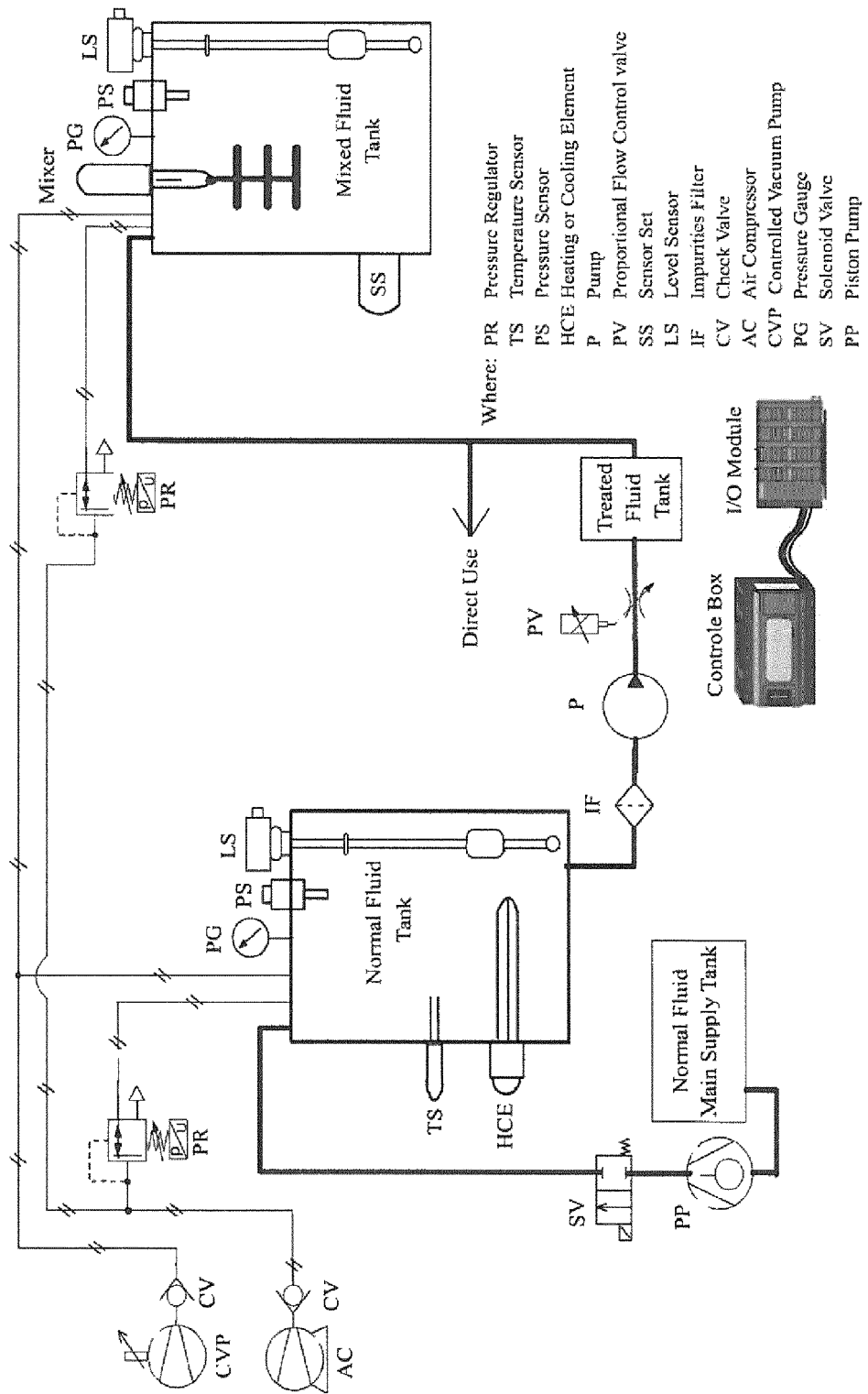
Figure 9: an exemplary mixing process using series flow one-tank configuration

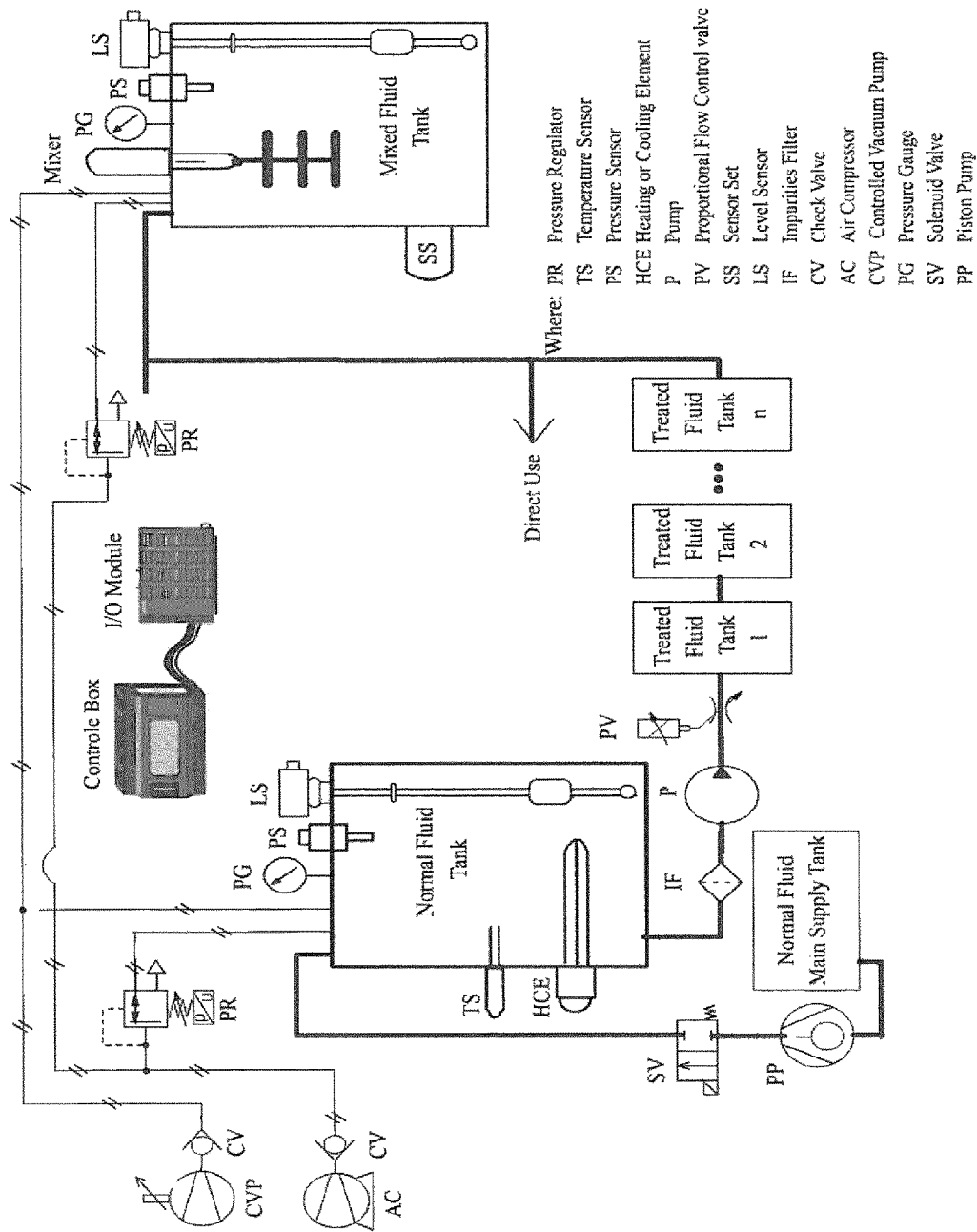
Figure 10: an exemplary mixing process using series flow n-tank configuration

METHOD AND APPARATUS FOR MAGNETIC/ELECTROSTATIC/ELECTROMAGNETIC TREATMENT OF FLUIDS COMPRISING THREE PHASES: THE TREATMENT PHASE, THE MIXING PHASE, AND THE USAGE PHASE WHICH ARE SPATIALLY AND TEMPORALLY DECOUPLED

CROSS REFERENCE TO RELATED PATENT APPLICATIONS

This application is a National Stage of International Application No. PCT/EP2014/056934 filed Apr. 7, 2014, claiming priority based on U.S. Provisional Patent Application No. 61/809,650, filed Apr. 8, 2013, the contents of all of which are incorporated herein by reference in their entirety.

TECHNICAL FIELD

The present invention pertains generally to the field of magnetic/electrostatic/electromagnetic treatment of fluids, and more specifically to a method and apparatus for magnetic/electrostatic/electromagnetic treatment of fluids that consists three separate and decoupled phases in both time and space. In the first phase (treatment phase), a field based on permanent magnets setup, or electrostatic setup, or electromagnetic setup is applied to a working fluid under controlled time and/or flow rate circulation process to obtain the directly ionized fluid that might be subjected to storage before being used in the second phase. In the second phase (mixing phase), the directly ionized fluid is used as an ionizer or an ionizing agent for ionizing indirectly the normal non-ionized fluid by mixing the directly ionized fluid and normal non-ionized fluid in accordance with a predetermined mixing ratio and mixing method between the directly ionized fluid and normal non-ionized working fluid. In the third phase (usage phase), the resultant mixed or indirectly-ionized fluid is used in the proper application directly or stored in a storage tank for later use. According to the embodiments of the invention, the three phases of the proposed method (treatment, mixing, and usage) are decoupled from each other completely in space and time. This means that the present invention achieves two types of decoupling between its phases:—
  a. Spatial decoupling. There is no need for the treatment process used in the first phase to be in the same location of the mixing process used in the second phase as in the case of all prior arts.
  b. Temporal decoupling. There is no need for simultaneous and synchronous production of the directly ionized fluid produced from the first phase and the mixed fluids produced in the second phase as in the case of all prior arts.

BACKGROUND

Magnetohydrodynamics (MHD) (magnetofluiddynamics or hydromagnetics) is the scientific discipline that studies the dynamics of electrically conducting fluids under the effect of magnetic fields. MHD is derived from "magneto" meaning magnetic field, and "hydro" meaning fluid, and "dynamics" meaning movement or motion. The field of MHD was initiated by Hannes Alfvén in 1942, for which he received the Nobel Prize in Physics in 1970.

The idea of MHD is that magnetic fields can induce currents in a moving electrically-conductive fluid, which create mechanical forces on the fluid, and also change the magnetic field itself. The set of equations which describe MHD are a combination of the familiar Navier-Stokes equations of fluid dynamics and Maxwell's equations of electromagnetism. Research studies indicate that magnetohydrodynamic effects are responsible for the magnetic treatment of fluids.

Magnetic treatment of fluids has been widely covered in the literature. Plenty of patents and research papers described methods or applications for the magnetic treatment of fluids. For example, more than 1500 patents and more than 2500 research papers (according to ISI web of science) have been published regarding the magnetic treatment.

Electrostatic treatment of fluids, on the other side, has received much less attention among the research society. For example, less than 50 papers and patents covered the electrostatic treatment of fluids according to ISI web of science. This is mainly due the risks and costs associated with electrostatic treatment of fluids where the fluid is exposed directly to electric current.

The applications of magnetic or electrostatic treatment of fluids cover mainly water treatment and fuel treatment for different purposes. All previous applications of magnetic or electrostatic treatment of fluids focused on either 1) the direct application of magnetic/electrostatic/electromagnetic fields of various flux densities and variable geometries on the moving fluid, where the entire or the totality of the fluid should pass directly through the magnetic or the electromagnetic field in order to be treated. This direct treatment fact is the hidden obstacle for the limited popularity of the magnetic treatment since it leads to effective treatment only in the initial phases of installation of magnetic treatment devices, and generally ineffective treatment in the later stages. 2) or the direct application of magnetic/electrostatic/electromagnetic fields of various flux densities and variable geometries on portions of the fluid, while the remaining portion of the fluid is kept untreated and is therefore mixed instantaneously and immediately with the treated volume of the fluid. This instantaneous and immediate mixing process might occur in one of three places:—1) within the treatment unit 2) within an external tank 3) or within a pipe connection utilizing a bypass conduit or using a three way valve.

In this regard, patent JP62007789A describes a treatment device that magnetizes fuel in order to improve the fuel efficiency by passing fuel through permanent magnet setup using flow passage chambers. The fuel outlet of the device is fed to the fuel consumption part. Patent WO97/01702A1 proposes a fuel conditioning device that improves the fuel efficiency where the fuel to be fired is forced to flow along a labyrinth path through the magnetic field in order to obtain a laminar stream of the fuel. The fuel outlet of the device is connected to either an injector or arburetor. Patent WO92/16460 covers a water treatment method for reducing corrosion and lime deposits from flowing water by continuously recirculating the water through the magnetic setup and the affected surfaces at as high speed as practically possible. The three mentioned patents use solely permanent magnet setups in 2D configurations, and the totality of the fluid is treated without any mixing process between the treated fluid and the untreated fluid.

Patents EP0200710A2 and U.S. Pat. No. 4,734,202 introduce a dual treatment method for water conditioning that subjects the water to magnetic and oligodynamic treatment where the water flows upwardly and has a flow rate which is adjusted (by the control of the bypass conduit) so that the oligodynamically active metal pieces remains approximately in suspension while moving back and forth. The two patents use permanent magnet setups in 2D configurations where immediate mixing process within a pipe connection take place to control the flow across the treatment unit only, and does not have the purpose of intentional mixing. In addition to that, no recirculation process across the treatment unit is performed with only single passage of the fluid across the treatment unit.

A deliberate immediate mixing between the untreated fluid and the treated fluid is provided in U.S. Pat. No. 4,320,003A where a device is proposed for the magnetic treatment of water to reduce and prevent the build-up of scale in the pipes and vessels through which the water flows by subjecting the water to flow in two parallel paths through the magnetic conditioner, whereby a portion of the fluid flows through the treatment chamber and is treated by the magnetic field, while the remainder of the fluid flows through the bypass chamber that is not subjected to the magnetic field. The device is used in water systems wherein a major portion of the water is recirculated continuously through the conditioner so that only a small portion of the water needs to be treated. The patent uses permanent magnet setups in 2D configurations and the aim of mixing was to maintain the operational conditions such as flow rates and pressures without affecting the magnetic treatment in water systems where a major portion of water is recirculated continuously. The immediate mixing process takes place within the treatment unit to eliminate the use of external bypass conduit.

In U.S. Pat. No. 5,534,156, A method for magnetic treatment of water is presented that kills microorganisms in water systems and reservoirs by removing a volume of the water containing microorganisms, subjecting it to magnetic field, and then returning the treated water immediately back the water system through a pump. The invention proposed two treatment methods including the batch treatment and the injection treatment wherein the greater the ratio of the treated water to untreated water, the greater the effectiveness of the treatment. The patent uses permanent magnet setups in 2D configurations and the aim of mixing was to maximize the ratio of the treated water with respect of the untreated water in order to improve the effectiveness of the treatment to kill microorganisms in water. The immediate mixing process takes place within an external tank using a circulation system with a pump.

A method for High frequency electromagnetic field treatment (microwave irradiations) of multiphase fluid comprising an aqueous phase and fluid hydrocarbon is covered in EP1970109A1. The method is used for separating a multiphase fluid comprising an aqueous phase dispersed in a fluid hydrocarbon phase into its components, by passing the multiphase fluid through a high frequency microwave irradiations within the range 1 MHz to 10 GHz, wherein the aqueous phase of the multiphase fluid is rapidly and selectively heated, for an exposure time of less than 5 seconds with a power density in the aqueous phase of at least $10^5$ W/m$^3$ The irradiated multiphase fluid is then passed to a separator wherein the multiphase fluid is separated into its components. According to the embodiments of the invention, the temperature differential between the two phases achieved by microwave irradiations is at least 20° C. wherein the temperature of the aqueous phase is at least 50° C. The immediate mixing process takes place within an external tank using a circulation system with a pump. According to the invention, a portion of the fluid to be treated is recycled one or more additional cycles of treatment, and the treated volume might be mixed immediately with untreated volume using either batch treatment or injection treatment.

The most recent patents that utilize immediate mixing process within an external tank using a pump are given in patents WO2011/086522A1 and US2012/0305383A1. The cited invention utilizes a dual treatment methodology based on ultrasound treatment and high frequency Electromagnetic field treatment with the goal of increasing the yield of the more valuable light hydrocarbons from the treated crude oil and petroleum products residuum. A method for treatment of crude oil and petroleum products is introduced based on a two stage treatment process, by subjecting the fluid to be treated to ultrasound vibrations in the first stage, and to high frequency electromagnetic field in the second stage, wherein the high frequency electromagnetic field comprises a component generated from the ultrasound stage, and another component from an external current source that operates at one or more frequencies in the range from 1 GHz to 15 GHz at a power of no more than 1 W. According to the embodiments of the invention, the intensity of the ultrasound vibrations is lower than 1 MW/m$^2$ while the frequency of the acoustic vibrations may be between 20 Hz to 200 KHz. The ultrasound treatment may be carried out using ultrasound vibrations at a single frequency or over a number of frequencies within the range. According to the invention, a portion of the fluid to be treated is recycled one or more additional cycles of treatment, and the treated volume might be mixed immediately with untreated volume. The immediate mixing process takes place within an external tank using a circulation system with a pump.

Regarding the electrostatic water treatment, U.S. Pat. No. 4,545,887 disclosed an electrostatic electrode that is placed in a storage tank of a water system for the purpose of improving de-scaling performance, while U.S. Pat. No. 5,591,317 proposed an electrostatic field generator for water treatment that might be applied for in-line and/or in-tank applications for improving particulate dispersions and reducing scaling. U.S. Pat. No. 4,902,390 disclosed an electrostatic in-tank and/or in-line water treatment system for the purpose of reduction of bacterial counts in water systems, while U.S. Pat. No. 4,012,310 there was provided an electrostatic water treatment system with a control circuitry to assure the proper operation of the system. In U.S. Pat. No. 4,073,712, a device for treating a fluid with an electrostatic field is given for the purpose of scale prevention whether in heating applications like steam boilers or cooling applications like water chillers. A water decontamination system with electrostatic treatment and ultraviolet radiation is explained in U.S. Pat. No. 5,217,607 to minimize inorganic and organic contaminants in water circulation system. Electrostatic fuel treatment has received much less attention among researchers. For example, U.S. Pat. No. 4,173,206 described an electrostatic fuel injector for combustion systems. It is also noted that all of the prior art patents related to electrostatic fluid treatment do not include any mixing process between the treated fluid and the untreated fluid before using the working fluid in the proper application.

The present invention is directed to overcoming these and other deficiencies in the art.

SUMMARY

The common feature among all previously mentioned patents that contain mixing process between the treated fluid (using magnetic field generated from permanent magnet setups or electromagnetic field), and the untreated fluid is that the mixing process is instantaneously and immediately performed after the production of the treated fluid. This means that the production of treated fluid is coupled in time and space with the mixing process, where the production of treated fluid must be performed at the same time of mixing and in the same location (on-site treatment and mixing). This space and time coupling between the production of treated fluid and the mixing process put on the ground a major restriction where the treatment plants for the production of treated fluid must be at the same place of the mixing process.

In addition to that, the previously mentioned patents utilizing mixing process suffers from the scaling process, where some of the cited methods cannot be scaled up for the treatment of a refinery for example, or some cannot be scaled down to cover the consumption of small consumers of few liters per unit time (day or month, etc). Furthermore, the installation of the on-site treatment units requires some modifications in the existing systems or plants to generate the instantaneously mixed fluid. This requires at least few changes in the piping systems in addition to possible shutdown of the targeted plants.

From the previous discussion, the applicant has recognized that there is a strong need for an improved treatment method that overcomes some or all of the previous shortcomings of the previous methods and inventions that utilize the mixing process. An object of the current invention is to provide and method and an apparatus for the magnetic/electrostatic/electromagnetic treatment of fluids that consists three separate and decoupled phases in both time and space. In the first phase (treatment phase), a field based on permanent magnets setup, or electrostatic setup, or electromagnetic setup is applied to a working fluid under controlled time and/or flow rate circulation process to obtain the directly ionized fluid that might be subjected storage before being used in the second phase. In the second phase (mixing phase), the directly ionized fluid is used as an ionizer or an ionizing agent for ionizing indirectly the normal non-ionized fluid by mixing the directly ionized fluid and normal non-ionized fluid in accordance with a predetermined mixing ratio and mixing method between the directly ionized fluid and normal non-ionized working fluid. In the third phase (usage phase), the resultant mixed or indirectly-ionized fluid is used in the proper application directly or stored in a storage tank for later use. According to the embodiments of the invention, the three phases of the proposed method (treatment, mixing, and usage) are decoupled from each other completely in space and time. This means that the present invention achieves two types of decoupling between its phases:—
  a. Spatial decoupling. There is no need for the treatment process used in the first phase to be in the same location of the mixing process used in the second phase as in the case of all prior arts.
  b. Temporal decoupling. There is no need for simultaneous production of the directly ionized fluid produced from the first phase and the mixed fluids produced in the second phase as in the case of all prior arts.

The proposed method described in this invention has the following advantages:— 1) complete decoupling in time and space between the three phases of the proposed process where the production of treated fluid (phase I), the mixing process between the treated fluid and the untreated fluid (phase II), and the usage of the mixed fluid in the proper application (phase III) are completely decoupled in time and space. This means that there is no need for the treatment plants to be in the same location of the mixing plants (spatial decoupling, and there is no need for simultaneous and concurrent production of the treated and the mixed fluids (temporal decoupling) where the treated fuel is immediately and instantaneously mixed after its production as in the reported methods in literature. 2) The elimination of on-site treatment and mixing. This is a very important feature of the current invention since if the treatment plants is to be installed in an existing systems and plants, there might not be (in some cases) a space for any additional equipments to be installed in the site. 3) The ease of scaling the treatment plants from few liters of treated fluid to thousands of cubic meters of treated fluid. 4) Ease of use since there is no need for any modifications to be performed in the systems and plants. This is due to the fact that the production phase is completely decoupled from the mixing and the usage phases. The treated fluid might be packaged in containers matching the consumer requirements from bottles of less than one liter capacity to tankers of tens of cubic meters according the targeted application, preferable mixing ratio and mixing method.

It is therefore an object of the present invention to provide a method and apparatus for magnetic/electrostatic/electromagnetic treatment of fluids that overcomes the drawbacks of existing magnetic/electrostatic/electromagnetic treatment of fluids which includes either:— 1) the direct application methods where magnetic or electromagnetic or electrostatic fields of various flux densities and variable geometries is applied on the moving fluid, where the entire or the totality of the fluid should pass directly through the magnetic/electrostatic/electromagnetic field in order to be treated, 2) the immediate and instantaneous mixing methods where direct application of magnetic/electrostatic/electromagnetic fields of various flux densities and variable geometries on portions of the fluid, while the remaining portion of the fluid is kept untreated and is therefore mixed immediately and instantaneously with the treated volume of the fluid.

According to the embodiment of the present invention, a method and an apparatus for the magnetic/electrostatic/electromagnetic treatment of fluids that consists three separate and decoupled phases in both time and space is presented. In the first phase (treatment phase), a field based on permanent magnets setup, or electrostatic setup, or electromagnetic setup is applied to a working fluid under controlled time and/or flow rate circulation process to obtain the directly ionized fluid that might be subjected to storage before being used in the second phase. In the second phase (mixing phase), the directly ionized fluid is used as an ionizer or an ionizing agent for ionizing indirectly the normal non-ionized fluid by mixing the directly ionized fluid and normal non-ionized fluid in accordance with a predetermined mixing ratio and mixing method between the directly ionized fluid and normal non-ionized working fluid. In the third phase (usage phase), the resultant mixed or indirectly-ionized fluid is used in the proper application directly or stored in a storage tank for later use. According to the embodiments of the invention, the three phases of the proposed method (treatment, mixing, and usage) are decoupled from each other completely in space and time. This means that the present invention achieves two types of decoupling between its phases:—
  a. Spatial decoupling. There is no need for the treatment process used in the first phase to be in the same location of the mixing process used in the second phase as in the case of all prior arts,
  b. Temporal decoupling. There is no need for simultaneous production of the directly ionized fluid produced from the first phase and the mixed fluids produced in the second phase as in the case of all prior arts.

This means that according to the present invention, the first fluid is the normal non-ionized fluid that does not pass through any direct magnetic/electrostatic/electromagnetic field, while the second fluid is the directly ionized fluid that undergoes direct magnetic/electrostatic/electromagnetic treatment as explained in phase I. In the third mixed or indirectly-ionized fluid that is produced from phase II, the first normal non-ionized fluid becomes ionized and treated indirectly from the second directly ionized fluid, and the third mixed or indirectly-ionized fluid becomes totally treated and ionized. In other words, the second directly ionized fluid serves as an ionizer or an ionizing agent for ionizing the first normal non-ionized fluid.

In the sense of the present invention, the term "directly ionized" or "directly treated" or simply "treated" referring to fluids particularly means that fluids are magnetic/electrostatic/electromagnetic treated using direct magnetic/electrostatic/electromagnetic field of certain geometry and flux density, which may be provided, for example, by a device or unit producing said respective field. Furthermore, the term "normal non-ionized", or "normal", or simply "untreated", which refers to fluids, particularly means that the respective fluids are not ionized or do or did not pass through any direct magnetic/electrostatic/electromagnetic field. Additionally, the term "mixed" or "indirectly-ionized" referring to fluids particularly means that fluids that become ionized or treated by the directly ionized fluid that serves as an ionizer or ionizing agent, and without being under the influence of any direct magnetic/electrostatic/electromagnetic field.

Preferably, the mixing process in phase II between the second directly ionized fluid and first normal non-ionized fluid is carried out in according with a predetermined mixing ratio, where the majority of mixture is of the first normal non-ionized fluid.

Preferably, the mixing process in phase II between the second directly ionized fluid and first normal non-ionized fluid is carried out in according with a predetermined mixing method.

Preferably, the treatment unit used in "phase I" for the production of the directly ionized fluid can be either a permanent magnet setup, electrostatic setup, or an electromagnetic setup. The magnetic/electrostatic/electromagnetic field in the treatment unit can be of any geometry (one-dimensional, two-dimensional, or three-dimensional fields) and according to the desired flux density values; the required angle between the applied field and the direction of fluid flow can be of any angle like 90, 0, 180 degrees or any other required angle.

Preferably, the process of applying magnetic/electrostatic/electromagnetic fields of certain flux densities and geometries on the directly ionized fluid within the treatment unit in "phase I" is carried out while the fluid is under controlled time and/or flow rate circulation process.

Preferably, the production process of the directly ionized fluid as explained in "phase I" can be achieved using the "inline pre-treatment and post-treatment sensors configuration" that comprises of: first, filling the normal non-ionized fluid in the treatment vessel from the normal fluid main supply tank; and second, performing a controlled time and/or flow rate circulation process through the treatment unit that outputs its flow back to the treatment vessel. In this configuration, a group of required sensors (that may be application and fluid dependent) are installed before and after the treatment unit that sends its sensory data to the control box in order to trace the changes in the physical and chemical quantities of the directly ionized fluid with time before and after the treatment unit for control and analysis purposes.

Alternatively, the production process of the directly ionized fluid as explained in "phase I" can be also achieved using the "in-tank sensors configuration" that comprises of: first, filling the normal non-ionized fluid in the treatment vessel from the normal fluid main supply tank; and second, performing a controlled time and/or flow rate circulation process through the treatment unit that outputs its flow back to the treatment vessel. In this configuration, a group of required sensors (that may be application and fluid dependent) are installed in the treatment vessel that the sends its sensory data to the control box in order to trace the changes in the physical and chemical quantities of the directly ionized fluid with time for the fluid in the treatment tank.

Alternatively, the production process of the directly ionized fluid as explained in "phase I" can be also achieved using the "parallel flow configuration" that comprises of: first, filling the normal non-ionized fluid in the treatment vessel from the normal fluid main supply tank; and second, performing a controlled time and/or flow rate circulation process where the treatment vessel simultaneously receives a first controlled flow through the treatment unit and a second controlled flow directly from the treatment vessel.

Preferably, the mixing process as explained in "phase II" can be achieved using the bottom configuration that comprises of: first, depositing the second directly ionized fluid in the bottom of a mixing vessel; and second depositing the first normal non-ionized fluid on the top of the second directly ionized fluid. This process might be also repeated many times (alternative bottom configuration).

Alternatively, the mixing process as explained in "phase II" can also be achieved using the top configuration that comprises of: first, depositing the first normal non-ionized fluid in the bottom of a mixing vessel; and second, depositing the second directly ionized fluid on the top of the first normal non-ionized fluid. This process might be also repeated many times (alternative top configuration).

Alternatively, the mixing process as explained in "phase II" can also be achieved using the parallel flow two-tank configuration that comprises of: providing a first vessel for receiving the second directly ionized fluid; providing a second vessel for receiving the first normal non-ionized fluid; and providing a third vessel for receiving the third mixed or indirectly-ionized fluid that is in connection with the first and second vessels for simultaneously receiving a first controlled flow of the second directly ionized fluid and a second controlled flow of the first normal non-ionized fluid.

Alternatively, the mixing process as explained in "phase II" can also be achieved using the series flow one-tank configuration that comprises of: providing a first vessel for receiving the first normal non-ionized fluid; providing a second smaller vessel for receiving the second directly ionized fluid, and providing a third vessel for receiving the mixed or indirectly-ionized fluid, where the second small vessel receives a controlled flow of the first normal non-ionized fluid from the first vessel and outputs a flow of mixed or indirectly-ionized fluid for the third vessel comprising the second directly ionized and first normal non-ionized fluid. This process might be also adjusted to have n-tanks in series for receiving the second directly ionized fluid where each tank is connected in series to the next tank, and the nth tank outputs a flow of mixed or indirectly-ionized fluid for the third vessel comprising the second directly ionized and first normal non-ionized fluid (series flow n-tank configuration).

As a further aspect of the invention, there are provided exemplary configurations for the production of directly ionized fluid as explained in "phase I" that include inline pre-treatment and post-treatment sensors configuration as shown in FIG. 1, in-tank sensors configuration as shown in FIG. 2, parallel flow configuration as shown in FIG. 3.

As a further aspect of the invention, there are provided configurations for the mixing processes as explained in "phase II" that include bottom configuration as shown in FIG. 4, alternative bottom configuration as shown in FIG. 5, top configuration as shown in FIG. 6, alternative top configuration as shown in FIG. 7, parallel flow two-tank configuration as shown in FIG. 8, series flow one-tank configuration as shown in FIG. 9, series flow n-tank configuration as shown in FIG. 10.

As another aspect of the invention, there is provided a method of treating a fluid, the method comprising using a second directly ionized fluid resulting from "phase I" as an ionizer or an ionizing agent for ionizing the first normal non-ionized fluid in "phase II".

Preferably, using the second directly ionized fluid resulting from "phase I" as an ionizer or an ionizing agent for ionizing the first normal non-ionized fluid comprises mixing the first and second fluid in accordance with a predetermined mixing ratio as explained in "phase II".

BRIEF DESCRIPTION OF THE DRAWINGS

Further features and advantages of the present invention will become apparent from the following detailed description, taken in combination with the appended drawings.

FIG. 1 shows an exemplary production process of the directly ionized fluid as explained in "phase I" using inline pre-treatment and post-treatment sensors configuration.

FIG. 2 shows an exemplary production process of the directly ionized fluid as explained in "phase I" using in-tank sensors configuration FIG. 3 shows an exemplary production process of the directly ionized fluid as explained in "phase I" using parallel flow configuration FIG. 4 shows an exemplary mixing process as explained in "phase II" using bottom configuration FIG. 5 shows an exemplary mixing process as explained in "phase II" using alternative bottom configuration FIG. 6 shows an exemplary mixing process as explained in "phase II" using top configuration FIG. 7 shows an exemplary mixing process as explained in "phase II" using alternative top configuration FIG. 8 shows an exemplary mixing process as explained in "phase II" using parallel flow two-tank configuration FIG. 9 shows an exemplary mixing process as explained in "phase II" using series flow one-tank configuration FIG. 10 shows an exemplary mixing process as explained in "phase II" using series flow n-tank configuration

DETAILED DESCRIPTION

In accordance with a first aspect of the present invention, there is, as an example, provided a method for magnetic/electrostatic/electromagnetic fluid treatment where the normal fluid is treated or ionized without being the object of direct magnetic/electrostatic/electromagnetic field.

Another aspect the present invention relates to an apparatus for direct magnetic/electrostatic/electromagnetic treatment of fluids including a) a first fluid tank containing a first normal non-ionized fluid; b) a second fluid tank containing a second directly ionized fluid, wherein the second directly ionized fluid is produced by applying a direct magnetic/electrostatic/electromagnetic field to the first normal non-ionized fluid while the fluid is in circulation; c) a treatment unit configured to apply the magnetic/electrostatic/electromagnetic field to the fluid in the second fluid tank; d) a circulation pump for circulating the fluid in the second fluid tank under the influence of the magnetic/electrostatic/electromagnetic field generated from the treatment unit; e) a proportional valve for controlling the flow rate of the fluid in the second fluid tank; f) a circulation conduit comprising a first conduit connecting the second fluid tank with the treatment unit; a second conduit connecting the treatment unit with the second fluid tank; and a third conduit connecting first fluid tank with the second fluid tank; i) a plurality of actuators and sensors for controlling the operating conditions of the fluid in the second fluid tank and the circulation conduit; j) a plurality of sensors capable of detecting changes in the physical and chemical properties of the fluid in the second fluid tank; and k) an optional mixer for mixing the fluid in the second fluid tank.

In one embodiment, the treatment unit comprises a permanent magnet setup for applying a magnetic field an electrostatic setup for applying the electrostatic field, or an electromagnetic setup for applying the electromagnetic field. In another embodiment, the apparatus has a plurality of sensors capable of detecting changes in the physical and chemical properties of the fluid in the second fluid tank and placed at a position such that the sensor is capable of detecting changes in physical and chemical properties of the fluid before the treatment unit and after the treatment unit.

In another embodiment, the apparatus has plurality of sensors capable of detecting changes in the physical and chemical properties of the fluid in the second fluid tank and provided in the interior of the second fluid tank.

In another embodiment, the apparatus has a plurality of actuators and sensors controlling the operating conditions of the fluid in the second fluid tank. The actuators and sensors are in direct connection with the second fluid tank and the circulation conduit. In yet another embodiment, the totality of the fluid in the second fluid tank is capable of passing through the treatment unit without any bypass conduit. In yet another embodiment, a fraction of the fluid in the second tank is capable of passing through the treatment unit and the remaining fraction is capable of passing through a bypass conduit.

In accordance with a another aspect of the present invention, there is provided the apparatus for indirect magnetic/electrostatic/electromagnetic treatment of fluids by performing a mixing step between the first normal non-ionized fluid and the second directly ionized fluid including a) a first fluid tank containing a first normal non-ionized fluid; b) a second fluid tank containing a second directly ionized fluid; c) a third fluid tank containing a third indirectly ionized fluid, wherein the third indirectly ionized fluid is produced by mixing the second directly ionized fluid with the first normal non-ionized fluid; d) a first proportional valve for controlling the flow rate of the first al non-ionized fluid; e) a second proportional valve for controlling the flow rate of the second directly ionized fluid; f) a plurality of actuators and sensors for controlling the mixing conditions of the third indirectly ionized fluid in the third fluid tank; g) a first conduit connecting the first fluid tank with the third fluid tank; and h) a second conduit connecting the second fluid tank with the third fluid tank.

In one embodiment, the apparatus can be adapted such that the second directly ionized fluid and the first normal non ionized fluid are mixed in the third fluid tank. In another embodiment, the apparatus can be adapted such that the second directly ionized fluid and the first normal non ionized fluid are mixed in the conduit connecting the first and second fluid tanks with the third fluid tank.

Another aspect the invention includes an apparatus for indirect magnetic/electrostatic/electromagnetic treatment of fluids by mixing the first normal non-ionized fluid and the second directly ionized fluid comprising a) a first fluid tank containing a first normal non-ionized fluid; b) a second fluid tank containing a second directly ionized fluid; c) a third fluid tank containing a third indirectly ionized fluid, wherein the third indirectly ionized fluid is produced by mixing the second directly ionized fluid with the first normal non-ionized fluid; d) a first conduit connecting the first fluid tank with the second fluid tank; e) a second conduit connecting the second fluid tank with the third fluid tank; f) a proportional valve for controlling the flow rate of the first normal non-ionized fluid; and g) a plurality of actuators and sensors for controlling the mixing conditions of the third indirectly ionized fluid in the third fluid tank.

In one embodiment, the apparatus is adapted such that the second directly ionized fluid and the first normal non ionized fluid are mixed in the second fluid tank. In yet another embodiment, the apparatus is adapted such that the second directly ionized fluid and the first normal non ionized fluid are mixed in a plurality of tanks connected in series.

An aspect of the invention is related to a method of direct magnetic/electrostatic/electromagnetic treatment of fluids including a) providing a volume of a first normal non-ionized fluid to a second fluid tank; b) applying a direct magnetic/electrostatic/electromagnetic field to the first normal non-ionized fluid; c) circulating the normal non-ionized fluid in the second fluid tank through a treatment unit that outputs its flow back to the second fluid tank for a controlled time and/or controlled flow rate, with optional intermittent circulation cycles, to produce a second directly ionized fluid; d) measuring the properties of the second directly ionized fluid in the second fluid tank using at least one sensor to obtain at least one measurement: e) adjusting the operating conditions of the second directly ionized fluid in the second fluid tank based on the obtained measurement; and f) optionally performing mixing process of the second directly ionized fluid in the second fluid tank using a mixer or a mixing pump according to a controlled mixing duty cycle.

In one embodiment, the method of direct magnetic/electrostatic/electromagnetic treatment of fluids according to the invention is such that the totality of the fluid in the second fluid tank is passing through the treatment unit without any bypass conduit. In another embodiment, the method of direct magnetic/electrostatic/electromagnetic treatment of fluids according to the invention is such that a fraction of the fluid in the second fluid tank is passing through the treatment unit and the remaining fraction is passing through a bypass conduit.

In another embodiment, the method of direct magnetic/electrostatic/electromagnetic treatment of fluids involves the process of applying magnetic/electrostatic/electromagnetic fields on the directly ionized fluid within the treatment unit while the fluid is under controlled circulation environments. This means that the circulation process might be controlled using the common on-off mode of control where the circulation process is completely turned on for certain period, and completely turned off for certain period. The ratio between the time of turning on the circulation process to the overall on and off time within one complete cycle is defined as the circulation duty cycle. This circulation duty cycle might have values from 0% (totally off for certain time) to 100% (totally on for certain time).

In another embodiment, the method of direct magnetic/electrostatic/electromagnetic treatment of fluids also includes at least one sensor that is configured to control the temperature, pressure, flow rate, circulation duty cycle, mixing duty cycles, level and/or volume of the fluid in the second tank. This means that the mixing process might be controlled using the common on-off mode of control where the mixing process is turned on for certain period, and turned off for certain period. The ratio between the time of turning on the mixing process to the overall on and off time within one complete cycle is defined as the mixing duty cycle. This mixing duty cycle might have values from 0% (totally off for certain time) to 100% (totally on for certain time).

In another embodiment of the present invention, the flow rate and the circulation duty cycles of the second directly ionized fluid are fluid and application dependent. The controlled variables can be tuned and controlled according to certain desired values that might have a constant or a variable time profile based on feedback of at least one sensor. The sensors used in this regard might be inline conductivity sensors, inline viscosity sensors, inline density sensors, inline TDS sensors, inline PH sensors, or any other type of sensors that is mostly related to the dominant physical and chemical properties of the fluid to be ionized. This means that the sensors selection process is fluid dependent. Once the proper sensors are selected, the actions to be taken by the control system depend the measured values of these sensors and these values and actions are application dependent. For example, if we install an inline conductivity sensor in the second fluid tank, this selection process will depend on the fluid to be ionized (say water for example). After that, when we operate the direct treatment method, we will trace the changes in the conductivity in the second fluid to be ionized. The changes in the conductivity might be for values lower than the reference values of the normal non-ionized fluid, or for higher values than the reference values of the normal non-ionized fluid. The selection process for the two mentioned scenarios will depend on our application and our understanding of the use of the second ionized fluid in that application and will not be fluid dependent.

In another embodiment of the present invention, if the second directly ionized fluid is stored, the quality, properties and features of the stored second directly ionized fluid are preserved. This means that if the second directly ionized fluid is used directly in the proper application or stored for later use, the goals and objectives of using it as a magnetizer for the first normal non-ionized fluid will be maintained. For example, if diesel is ionized and used after three or four years of its production, then it will give the same results as if it is used immediately in the proper application.

In an additional aspect of the present invention, the method of indirect magnetic/electrostatic/electromagnetic treatment of fluids includes a step of mixing a second directly ionized fluid and a first normal non-ionized fluid in accordance with a predetermined mixing ratio to generate a third indirectly ionized fluid wherein the third indirectly ionized fluid is ionized indirectly from the second directly ionized fluid.

In one embodiment, the second directly ionized fluid can be used as an ionizer r an ionizing agent for ionizing the first normal non-ionized fluid. In another embodiment of the present invention, the third indirectly-ionized fluid is not subjected to any direct magnetic/electrostatic/electromagnetic treatment. The mixing ratio between the second directly ionized fluid and the first normal non-ionized fluid is application dependent and fluid dependent. For example, the mixing process between normal water and ionized water for the purpose of concrete strength improvement will have a mixing ratio that is different from the mixing process between normal diesel and ionized diesel for the purpose of combustion improvement, even though the operational conditions (temperature, pressure, level, volume, flow rate, circulation duty cycles, mixing duty cycles) for the production of the directly ionized fluid in both cases are similar.

In one embodiment, the method of indirect magnetic/electrostatic/electromagnetic treatment of fluids includes a) a first step of depositing the second directly ionized fluid in the bottom of a mixing vessel; and b) a second step of depositing the first normal non-ionized fluid on the top of the second directly ionized fluid; and c) repeating the above first and second steps once or a plurality of times.

In another embodiment, the method of indirect magnetic/electrostatic/electromagnetic treatment of fluids includes a) a first step of depositing the first normal non-ionized fluid in the bottom of a mixing vessel; b) a second step of depositing the second directly ionized fluid on the top of the first normal non-ionized fluid; and c) repeating the above first and second steps once or plurality of times.

In another embodiment, the method of indirect magnetic/electrostatic/electromagnetic treatment of fluids includes a) providing a first vessel for receiving the first normal non-ionized fluid; b) providing a second vessel for receiving the second directly ionized fluid; and c) providing a third vessel for receiving the third indirectly-ionized fluid that is in fluidic connection with the first and second vessels for simultaneously receiving a first controlled flow of the first normal non-ionized fluid and a second controlled flow of the second directly ionized fluid.

In yet another embodiment, the method of indirect magnetic/electrostatic/electromagnetic treatment of fluids includes a) providing a first vessel for receiving the first normal non-ionized fluid; b) providing a second smaller vessel for receiving the second directly ionized fluid; and c) providing a third vessel for receiving the third indirectly-ionized fluid, where the second small vessel receives a controlled flow of the first normal non-ionized fluid from the first vessel and outputs a flow of third indirectly-ionized fluid for the third vessel comprising the first normal non-ionized fluid and the second directly ionized fluid.

In yet another embodiment, the method of indirect magnetic/electrostatic/electromagnetic treatment of fluids also includes a) providing a first vessel for receiving the first normal non-ionized fluid; b) providing a plurality of smaller vessels that are connected in series for receiving the second directly ionized fluid, and c) providing a third vessel for receiving the third indirectly-ionized fluid, where the first small vessel receives a controlled flow of the first normal non-ionized fluid from the first vessel and the plurality of small vessels output a flow of third indirectly-ionized fluid for the third fluid vessel.

the method of indirect magnetic/electrostatic/electromagnetic treatment of fluids can be such that the first fluid is the normal non-ionized fluid that does not pass through any direct magnetic/electrostatic/electromagnetic field, the second fluid is the directly ionized fluid that undergoes direct magnetic/electrostatic/electromagnetic treatment, and the third indirectly-ionized fluid, resulting from the mixing process between the first normal non-ionized fluid and the second directly ionized fluid, is ionized or treated indirectly from the second directly ionized fluid, and the third indirectly-ionized fluid becomes totally treated.

The method of indirect magnetic/electrostatic/electromagnetic treatment of fluids can be such that the second directly ionized fluid and the third indirectly-ionized fluid can be used immediately in the proper application or can be stored for later use. For example, if indirectly ionized diesel is used after three or four years of its production, then it will give the same results as if it is used immediately in the proper application.

In one embodiment, the production of the second directly ionized fluid can be spatially and temporally decoupled from the production of the third indirectly ionized fluid. The treatment plants can be such that they are not in the same location as the mixing plants.

In yet another embodiment, the third indirectly-ionized fluid can have better characteristics than the second directly ionized fluid and the first normal non-ionized fluid whenever used in the application if properly mixed according to the optimal mixing ratio and mixing procedure.

In yet another embodiment, the third indirectly ionized fluid can be used as an ionizer or ionizing agent for the first normal non-ionized fluid for more than one time depending on the mixing ratio and mixing procedure between the first normal non-ionized fluid and the second directly ionized fluid. For example, we might produce the third fluid by mixing the first normal non-ionized fluid and the second directly ionized fluid according to a mixing ratio of 100:1 (100 liter of the first normal non-ionized fluid and 1 liter of the second directly ionized fluid). After that, we might use this third fluid as ionizer or ionizing agent for the first normal non-ionized fluid (instead of the second fluid) by mixing the first normal non-ionized fluid and the third indirectly ionized fluid according to a mixing ratio of 1000:1 (1000 liter of the first normal non-ionized fluid and 1 liter of the third indirectly ionized fluid).

In one embodiment, if the third indirectly ionized fluid is stored, the quality, properties and features of the stored third indirectly ionized fluid are totally preserved. For example, if indirectly ionized diesel is used after three or four years of its production, then it will give the same results as if it is used immediately in the proper application.

In yet another embodiment, the second directly ionized fluid and the first normal non-ionized fluid used in the mixing process can be of similar chemical composition or have a different chemical composition. For example, we might mix normal non-ionized gasoline with a directly ionized gasoline, normal non-ionized gasoline with a directly ionized diesel, or we might mix normal non-ionized kerosene with a directly ionized diesel and so on.

In one embodiment. The method of indirect magnetic/electrostatic/electromagnetic fluid treatment comprises the following three phases that are decoupled in time and space: Phase 1 (treatment phase). In this phase, the second directly ionized fluid is produced by:— a. applying direct magnetic/electrostatic/electromagnetic field on the working fluid according to one, more or all of the following requirements:
   i. The required geometry of the field. We can apply one-dimensional, two-dimensional, three-dimensional fields.
   ii. The required values of the flux densities $B_x$, $B_y$, and $B_z$.
   iii. The required angle between the field and the fluid flow where the angle might be 90, 0, 180 degrees or any other required angle.

b. Circulating the working fluid under the effect of magnetic/electrostatic/electromagnetic field according to the selected treatment configuration (as shown in FIGS. 1 to 3) for the required time of circulation. Controlled on-off cycles for the circulation process across the field might be used in addition to the continuous on cycles. The flow rate, temperature, pressure, and volume of the working fluid is controlled while circulating it.

c. Mixing of the fluid in the treatment vessel using either a mixer or a mixing pump according to certain controlled duty mixing cycles.

2. Phase II (mixing phase). Mix the second directly ionized fluid with the first normal non-ionized fluid at the required mixing ratio between the volume of the second directly ionized fluid and the volume of first normal non-ionized fluid according to the selected mixing configuration (as shown in FIGS. 4 to 10). The mixing process might be in one of the following forms:

a. Addition of one type of fluid at a time in a mixing vessel. This process might take one of the following configurations.
        i. Bottom configuration. Add the second directly ionized fluid at the bottom of the mixing vessel then add the first normal non-ionized fluid at the top as shown in FIG. 4.
        ii. Alternative bottom configuration. Add the second directly ionized fluid at the bottom of the mixing vessel then add the first normal non-ionized fluid at the top. Then repeat this process many times as shown in FIG. 5.
        iii. Top configuration. Add the first normal non-ionized fluid at the bottom of the mixing vessel then add the second directly ionized fluid at the top as shown in FIG. 6.
        iv. Alternative top configuration. Add the first normal non-ionized fluid at the bottom of the mixing vessel then add the second directly ionized fluid at the top. Then repeat this process many times as shown in FIG. 7.
    b. Parallel flow two-tank configuration. In this scenario, we have one tank for directly ionized fluid, a second tank for the normal non-ionized fluid and a third tank for the mixed or indirectly-ionized fluid. Two proportional valves are placed at the first and second tank outputs that control the simultaneous mixing ratio between the directly ionized fluid and the normal non-ionized fluid as shown in FIG. 8.
    c. Series flow one-tank configuration. Here a simultaneous series mixing between the directly ionized fluid and the normal non-ionized fluid is performed. In this scenario, we have one tank for the directly ionized fluid, second tank for the normal non-ionized fluid and a third tank for the mixed or indirectly-ionized fluid. The normal non-ionized fluid flow from its tank that is controlled by proportional valve and passes through the treated tank where the output flow of treated tank can be used immediately in the application or stored in the third mixed tank. In this case, the volume of the treated tank and the proportional value opening ratio are the controlling parameters as shown in FIG. 9.
    d. Series flow n-tank configuration. Here a simultaneous series mixing between the directly ionized fluid and the normal non-ionized fluid is performed. In this scenario, we have n-tanks in series for the directly ionized fluid, a tank for the normal non-ionized fluid, and another tank for the mixed or indirectly-ionized fluid. The normal non-ionized fluid flow from its tank that is controlled by proportional valve and passes through the series of treated tanks where the output flow of last treated tank can be used immediately in the application or stored in the third mixed tank. In this case, the volume of the treated tanks and the proportional value opening ratio are the controlling parameters as shown in FIG. 10.

3. Phase III (usage phase). Use the mixed or indirectly-ionized fluid in the proper application. In this case, we have two scenarios. In the first scenario, the mixed or indirectly-ionized fluid is stored in the mixing tank for later use, while in the second scenario; the mixed or indirectly-ionized fluid is used immediately in the application without being stored in the mixing tank.

In yet another embodiment, the previously mentioned fluid treatment process has one, more or all of the following controlling parameters that are fluid dependent and application dependent:

Phase I. The production of the directly ionized fluid:
    a. The dimension and the geometry of the applied field (one-dimensional, two-dimensional, three-dimensional).
    b. The desired values of flux/current densities depending on the given dimension.
    c. The required angle between the applied field and the fluid flow where the angle might be 90 degrees (perpendicular direction), 0 degree (in the same direction), 180 degrees (in the opposite direction) or any other required angle.
    d. The required volume (level) of the directly ionized fluid.
    e. The required temperature and pressure of the directly ionized fluid.
    f. The flow rate of the fluid under the effect of the field.
    g. The required circulation time or application time of the field upon the fluid. Controlled on-off cycles for the circulation pump across the applied field might also be used in addition to the continuous on cycles.
    h. The geometry of the pipes under the treatment and their inner cross sections.

Phase II. mixing process parameters:
    i. The volume of the normal non-ionized fluid.
    j. The volume of directly ionized fluid.
    k. The required temperature and pressure of the normal non-ionized fluid and the directly ionized fluid.
    l. The mixing ratio between the two fluids controlled by the proportional valves openings whenever used.
    m. The mixing flow rates for the normal non-ionized fluid and the directly ionized fluid.

Phase III. Mixed fluid storage or usage parameters:
    n. The required temperature and pressure of the storage tank in case of storage case.

In yet another embodiment, The principal characteristics of the present invention may comprise one, more or all of
    a. Use of directly ionized or treated fluid as an ionizer or ionizing agent for the normal non-ionized fluid.
    b. Use of the field stored in the directly ionized fluid as a treatment methodology for the normal non-ionized fluid.
    c. Use of any magnetic/electrostatic/electromagnetic setup in the preparation of the directly ionized fluid,
    d. Use of one-dimensional, two-dimensional, or three-dimensional geometries of certain flux densities in the preparation of the directly ionized fluid.
    e. The temperature, pressure, flow rate, and volume (level) of the directly ionized fluid are tuned and controlled during the production of directly ionized fluid in phase I and the mixing process in phase II.
    f. The temperature, pressure, flow rate, and volume (level) of the normal non-ionized fluid and the mixed or indirectly-ionized fluid are tuned and controlled during the mixing process in phase II and in the storage process in phase III.

g. The heating or cooling element anywhere used in the figures means a heating and/or cooling system that controls the temperature of the fluid exactly as required.

h. All of the controlling parameters of the present invention might be controlled according to inline sensors data that can be used in all phases of the proposed process. These sensors are fluid dependent and application dependent. For example in case of fuel treatment, we might have used inline conductivity, viscosity and density sensors to observe the changes in the physical parameters of the fluid. If the working fluid is water, we might use inline PH and TDS sensors or any other sensors.

i. Use of most commonly used modes of operation regarding the angle between the applied field and the fluid flow where the angle might be 90, 0, 180 degrees or other angles.

j. The shape of the pipe in which the fluid is flowing under the effect of the applied field which might be straight, vertical-horizontal, helical three-dimensional (spring like) shapes or any other shape.

k. The fluid flow under the effect of the applied field during the preparation of the directly ionized fluid in phase I might be under the effect of gravitational forces in case of vertical flow or might be horizontal flow or at any angle.

l. Use of circular, square, or rectangular cross sections of the inner core of the pipe under the effect of the applied field.

m. The diameter of the pipe in which the fluid is flowing under the effect of the applied field might be in the micro level or the macro level or might take any value from nano size to centimeters size, n. The directly ionized fluid in phase I might be circulated continuously for certain period of time, or using controlled on-off cycles for the circulation process across the applied field.

o. The mixing ratio between the directly ionized fluid and the normal non-ionized fluid generally depends on the working fluid, the operating conditions of phase I, and the application.

p. The directly ionized fluid in phase I and the mixed or indirectly-ionized fluid in phase II might be kept at certain pressure and temperature for certain duration during their storage for later use.

q. The normal non-ionized fluid and the directly ionized fluid have generally the same chemical structure, but might have different chemical structure. For example, treated or ionized diesel might be used as the treating agent or ionizer for gasoline fuel, treated drinking water might be used as the treating agent or ionizer for sea water.

EXAMPLES

Example 1

Normal faucet water with a TDS of 650 ppm was electrostatically treated in the treatment vessel for 1 day according to the inline pre-treatment and post-treatment sensors configuration. The used sensors are the inline TDS and inline PH sensors. The operating conditions for the production of the directly ionized water in phase I are given in Table 1.

TABLE 1 operating conditions for the production of the directly ionized water in phase I.

| Number | Operating parameter | Operating value | Operating unit |
|---|---|---|---|
| 1 | Treatment vessel pressure | 5 | bar |
| 2 | Circulation line pressure | 10 | bar |
| 3 | Treatment vessel temperature | 50 | C.° |
| 4 | Circulation flow rate | 25 | Liter/hour |
| 5 | Tank volume | 50 | Liter |
| 6 | Tank level | 100% | % |
| 7 | Circulation duty cycle | 50%, 2 hour on, 2 hour off | % |

The directly ionized water is used as an ionizing agent or ionizer for the normal faucet water. The directly ionized water is mixed according to the bottom mixing configuration with the normal faucet water (with a TDS of 650 ppm) with a mixing ratio of 1000 ppm (1 ml of directly ionized water is mixed with 1 liter of normal faucet water) where the directly ionized water is added at the bottom of the mixing vessel, and the normal water is added after that.

The resultant mixed or indirectly-ionized water is then used for making and curing of concrete cubes according to EN123903, ASTM-C143, ASTM-C1077, and other related standard with compression strength of 250 N/mm². The crushing strength of the trial cubes was measured at different ages of the cubes staring from day 2 to day 28 from the casting date. The results of compression strength for the reference normal water, directly ionized water, and the resultant mixed or indirectly-ionized water are shown in table 2.

It is clear from table 2 that an improvement in the compression strength of the indirectly-ionized water is achieved as compared to reference normal water with an improvement ratio of 14% at the second day of casting, 32% at the fifth day of casting, 32% at the eighth day of casting, and 22% at the 28th day of casting.

From the other side, the directly ionized water results in less compression strength of as compared to reference normal water with reduction percentages from 3% to 32%. This facts points out to the limitations and drawbacks of using the directly treated fluids in the applications, and shows that the solution to this problems stems from using the resultant mixed or indirectly-ionized fluids instead of the directly treated fluids.

TABLE 2

Compression strength for the reference normal water, directly ionized water, and the resultant mixed or indirectly-ionized water at different ages of cubes.

| | Sample name | | |
|---|---|---|---|
| Measurement | reference normal water | directly ionized water | indirectly-ionized water |
| Age (days) | 2 | 2 | 2 |
| compression strength (N/mm2) | 151.9 | 96.6 | 172.7 |
| Percentage strength out of 250 | 60.7 | 38.6 | 69.1 |
| Standard reference percentage | 31.0 | 31.0 | 31.0 |
| Age (days) | 5 | 5 | 5 |
| compression strength (N/mm2) | 166.9 | 140.8 | 219.5 |

TABLE 2-continued

Compression strength for the reference normal water, directly ionized water, and the resultant mixed or indirectly-ionized water at different ages of cubes.

| | Sample name | | |
|---|---|---|---|
| Measurement | reference normal water | directly ionized water | indirectly-ionized water |
| Percentage strength out of 250 | 66.8 | 56.3 | 87.8 |
| Standard reference percentage | 60.0 | 60.0 | 60.0 |
| Age (days) | 8 | 8 | 8 |
| compression strength (N/mm2) | 175.5 | 121.9 | 231.8 |
| Percentage strength out of 250 | 70.2 | 48.7 | 92.7 |
| Standard reference percentage | 70.0 | 70.0 | 70.0 |
| Age (days) | 28 | 28 | 28 |
| compression strength (N/mm2) | 230.5 | 148.7 | 280.6 |
| Percentage strength out of 250 | 92.2 | 59.5 | 112.2 |
| Standard reference percentage | 100.0 | 100.0 | 100.0 |

Example 2

Commercial Jordanian diesel was magnetically treated in the treatment vessel for 2 days according to the in-tank sensors configuration. The used sensors are the conductivity, viscosity, and density sensors. The operating conditions for the production of the directly ionized diesel in phase I are given in table 3.

TABLE 3 operating conditions for the production of the directly ionized diesel in phase I.

| Number | Operating parameter | Operating value | Operating unit |
|---|---|---|---|
| 1 | Treatment vessel pressure | −1 | bar |
| 2 | Circulation line pressure | 5 | bar |
| 3 | Treatment vessel temperature | 70 | C.° |
| 4 | Circulation flow rate | 50 | Liter/hour |
| 5 | Tank volume | 500 | Liter |
| 6 | Tank initial level at starting day | 250 | Liter |
| 7 | Tank level at 2nd day | 500 | Liter |
| 8 | Circulation duty cycle | 50%, 1 hour on, 1 hour off | % |

The directly ionized diesel is used as an ionizing agent or ionizer for the normal commercial Jordanian diesel. The directly ionized diesel is mixed according to the top mixing configuration with the normal commercial Jordanian diesel with a mixing ratio of 100 ppm (0.1 ml of directly ionized diesel is mixed with 1 liter of normal commercial Jordanian diesel) where the normal commercial Jordanian diesel is added at the bottom of the mixing vessel, and the directly ionized diesel is added at its top.

The resultant mixed or indirectly-ionized diesel is then used as the diesel fuel for the "International Company for Ceramic Production" in Mafraq governate, Jordan for a period of three months. The average fuel consumption for the factory using the reference normal commercial diesel, and the resultant mixed or indirectly-ionized diesel are shown in table 4.

TABLE 4

Average fuel consumption for the ceramic factory using the reference normal commercial diesel, and the resultant mixed or indirectly-ionized diesel.

| Reference diesel consumption for a period of three months | indirectly-ionized diesel consumption for a period of three months | Percentage of Fuel saving |
|---|---|---|
| 1.15-1.2 liter/m² of produced ceramic | 0.95-1 liter/m² of produced ceramic | 17% |

In addition to the 17% fuel saving that was reported from the ceramic factory, a reduction in the soot emissions was observed from the furnace operators.

Example 3

Commercial Jordanian gasoline of grade 90 was electromagnetically treated in the treatment vessel for 12 hours according to the parallel flow configuration. The used sensors are the conductivity and density sensors. The operating conditions for the production of the directly ionized gasoline in phase I are given in table 5.

TABLE 5 operating conditions for the production of the directly ionized gasoline in phase I.

| Number | Operating parameter | Operating value | Operating unit |
|---|---|---|---|
| 1 | Treatment vessel pressure | 0 (atmospheric pressure) | bar |
| 2 | Circulation line pressure | 3 | bar |
| 3 | Treatment vessel temperature | 25 (room temperature) | C.° |
| 4 | Circulation flow rate | 2 | Liter/hour |
| 5 | Tank volume | 50 | Liter |
| 6 | Tank initial level at starting day | 50 | Liter |
| 7 | Circulation duty cycle | 100%, Continuous on | % |
| 8 | Bypass fluid percentage | 50% | % |

The directly ionized gasoline is used as an ionizing agent or ionizer for the normal commercial Jordanian gasoline. The directly ionized gasoline is mixed according to the two following stages of mixing:—

First stage. Where alternative bottom mixing configuration between the normal commercial Jordanian gasoline and the directly ionized gasoline with a mixing ratio of 50000 ppm (50 ml of directly ionized gasoline is mixed with 1 liter of normal commercial Jordanian gasoline) where the overall quantity of mixed gasoline is mixed at 10 equal stages with the directly ionized gasoline added at the bottom of the mixing vessel, and then the normal commercial Jordanian gasoline is added at its top, and so on for 10 times.

Second stage. Where top mixing configuration between the normal commercial Jordanian gasoline and the mixed or indirectly ionized gasoline that result from the first stage with a mixing ratio of 1000 ppm (1 ml of mixed or indirectly ionized gasoline resulting from the first stage is mixed with 1 liter of normal commercial Jordanian gasoline) where the normal commercial Jordanian diesel is added at the bottom of the mixing vessel, and the mixed or indirectly ionized gasoline that result from the first stage is then added at its top.

The resultant two-stage mixed or indirectly-ionized gasoline is then used as the gasoline fuel for different vehicles that operates on gasoline 90 grade. The average fuel consumption for the vehicles using the reference normal commercial gasoline, and the resultant two-stage mixed or indirectly-ionized gasoline are shown in table 6. The vehicle routes, speeds, and other conditions are kept under the same operating conditions.

TABLE 6

Average mileage for different vehicle brands using the reference normal commercial gasoline, and the resultant two-stage mixed gasoline.

| Number | Vehicle brand | Year of production | Reference fuel mileage (km/L) | two-stage mixed fuel mileage (km/L) | Fuel saving percentage (%) |
|---|---|---|---|---|---|
| 1 | Nissan-Sunny | 2008 | 15.1 | 18 | 19.2 |
| 2 | Hyundai-Accent | 2005 | 16.3 | 19.2 | 17.8 |
| 3 | Chevrolet-Aveo | 2013 | 14.8 | 16.3 | 10.1 |
| 4 | Kia-Sportage | 2012 | 11.2 | 12.8 | 14.3 |
| 5 | Mercedes-E200 | 2010 | 10.7 | 12.4 | 15.9 |

In addition to the 10%-20% fuel saving that was reported from the owners of the vehicles, an increase in the power of the engine was reported with about 20% increase of the reference power of the vehicle.

Example 4

Commercial Saudi Arabia diesel was magnetically treated in the treatment vessel for 2 days according to the inline pre-treatment and post-treatment sensors configuration. This treatment process took place in January 2009. The used sensors are the inline conductivity, viscosity, and density sensors. The operating conditions for the production of the directly ionized diesel in phase I are given in table 7.

TABLE 7 operating conditions for the production of the directly ionized diesel in phase I.

| Number | Operating parameter | Operating value | Operating unit |
|---|---|---|---|
| 1 | Treatment vessel pressure | 0 (atmospheric pressure) | bar |
| 2 | Circulation line pressure | 5 | bar |
| 3 | Treatment vessel temperature | 10 | C.° |
| 4 | Circulation flow rate | 10 | Liter/hour |
| 5 | Tank volume | 200 | Liter |
| 6 | Tank initial level at starting day | 100 | Liter |
| 7 | Tank level at 2nd day | 200 | Liter |
| 8 | Circulation duty cycle | Continuous on | 100% |

The directly ionized Saudi Arabia diesel is used as an ionizing agent or ionizer for the normal commercial Jordanian diesel. The directly ionized diesel is mixed according to the top mixing configuration with the normal commercial Jordanian diesel with a mixing ratio of 1000 ppm (1 ml of directly ionized diesel is mixed with 1 liter of normal commercial Jordanian diesel) where the normal commercial Jordanian diesel is added at the bottom of the mixing vessel, and the directly ionized diesel is added at its top. This mixing process took place in January 2009 immediately after the production of the directly ionized diesel.

The resultant mixed or indirectly-ionized diesel is divided into two parts; the first part was used immediately in pick-ups and diesel generators for the purpose of testing the immediate effect of the indirectly-ionized diesel. The second part was stored in storage tanks for later use for the purpose of testing the storage effect of the indirectly-ionized diesel. The average fuel consumption for the pick-ups using the reference normal commercial diesel, and the resultant mixed or indirectly-ionized diesel are shown in table 8. The pick-ups routes, speeds, and other conditions are kept under the same operating conditions. The average fuel consumption for the diesel generators using the reference normal commercial diesel and the resultant mixed or indirectly-ionized diesel are shown in table 9. The loading and the operating conditions of the diesel generators are kept the same while performing this test.

TABLE 8

Average mileage for different pick-up brands using the reference normal commercial diesel and the indirectly-ionized diesel where the indirectly-ionized diesel is used immediately without storage.

| number | Pick-up brand | Year of production | Reference fuel mileage (km/L) | mixed fuel mileage (km/L) | Fuel saving percentage (%) |
|---|---|---|---|---|---|
| 1 | Toyota | 1995 | 12.1 | 15.3 | 20.9 |
| 2 | Nissan | 2005 | 13.3 | 14.8 | 10.1 |
| 3 | Isuzu | 2007 | 14.2 | 16.5 | 13.9 |
| 4 | Mitsubishi | 2000 | 12.7 | 15.6 | 18.6 |

TABLE 9

Average fuel consumption for different diesel generator brands using the reference normal commercial diesel and the indirectly-ionized diesel where the indirectly-ionized diesel is used immediately without storage.

| number | Diesel generator brand | Year of production | Reference fuel consumption (L/kW) | mixed fuel consumption (L/kW) | Fuel saving percentage (%) |
|---|---|---|---|---|---|
| 1 | Marquis | 2005 | 0.46 | 0.35 | 23.9 |
| 2 | epsilon | 2007 | 0.43 | 0.34 | 20.9 |
| 3 | United power | 2006 | 0.38 | 0.29 | 23.7 |

From tables 8 and 9, it is obvious that a fuel saving within the range 10%-20% was achieved for the pick-ups, while a fuel saving within the range 20%-25% was achieved for the diesel generators. In addition to that, a reduction in the soot emission was also achieved using the indirectly-ionized diesel as compared with the reference normal commercial diesel.

The second part of the indirectly-ionized diesel that was stored in storage tanks was tested after four years of storage in order to check its validity and functionality. The same pick-ups and diesel generators were used again in this test. The average fuel consumption for the pick-ups using the reference normal commercial diesel, and the 4-year stored indirectly-ionized diesel are shown in table 10. The pick-ups routes, speeds, and other conditions are kept under the same operating conditions, The average fuel consumption for the diesel generators using the reference normal commercial diesel and the 4-year stored indirectly-ionized diesel are shown in table 11. The loading and the operating conditions of the diesel generators are kept the same while performing this test.

TABLE 10

Average mileage for different pick-up brands using the reference normal commercial diesel and the indirectly-ionized diesel where the indirectly-ionized diesel is used after four years of storage.

| number | Pick-up brand | Year of production | Reference fuel mileage (km/L) | mixed fuel mileage (km/L) | Fuel saving percentage (%) |
|---|---|---|---|---|---|
| 1 | Toyota | 1995 | 11.6 | 14.3 | 18.9 |
| 2 | Nissan | 2005 | 12.8 | 14.2 | 9.9 |
| 3 | Isuzu | 2007 | 13.7 | 15.7 | 12.7 |
| 4 | Mitsubishi | 2000 | 12.1 | 15.2 | 20.4 |

TABLE 11

Average fuel consumption for different diesel generator brands using the reference normal commercial diesel and the indirectly-ionized diesel where the indirectly-ionized diesel is used after four years of storage.

| number | Diesel generator brand | Year of production | Reference fuel consumption (L/kW) | mixed fuel consumption (L/kW) | Fuel saving percentage (%) |
|---|---|---|---|---|---|
| 1 | Marquis | 2005 | 0.46 | 0.35 | 23.9 |
| 2 | epsilon | 2007 | 0.43 | 0.34 | 20.9 |
| 3 | United power | 2006 | 0.38 | 0.29 | 23.7 |

The results obtained using this test shows that the indirectly-ionized diesel preserve its features after four years of storage, and it is not affected by the storage period by any means.

In the last part of this test, we use the directly ionized diesel that is stored for four years as an ionizing agent or ionizer for the normal commercial Jordanian diesel. The 4-years stored directly ionized diesel is m fixed according to the top mixing configuration with the normal commercial Jordanian diesel with a mixing ratio of 1000 ppm (1 ml of 4-years stored directly ionized diesel is mixed with 1 liter of normal commercial Jordanian diesel) where the normal commercial Jordanian diesel is added at the bottom of the mixing vessel, and the 4-years stored directly ionized diesel is added at its top.

The average fuel consumption for the pick-ups using the reference normal commercial diesel, and the mixed or indirectly-ionized diesel are shown in table 12. The pick-ups routes, speeds, and other conditions are kept under the same operating conditions. The average fuel consumption for the diesel generators using the reference normal commercial diesel and the resultant mixed or indirectly-ionized diesel are shown in table 13. The loading and the operating conditions of the diesel generators are kept the same while performing this test.

TABLE 12

Average mileage for different pick-up brands using the reference normal commercial diesel and the indirectly-ionized diesel where the directly-ionized diesel is used after four years storage.

| Number | Pick-up brand | Year of production | Reference fuel mileage (km/L) | mixed fuel mileage (km/L) | Fuel saving percentage (%) |
|---|---|---|---|---|---|
| 1 | Toyota | 1995 | 11.8 | 14.1 | 16.3 |
| 2 | Nissan | 2005 | 12.6 | 14.4 | 12.5 |
| 3 | Isuzu | 2007 | 13.5 | 15.6 | 13.5 |
| 4 | Mitsubishi | 2000 | 12.3 | 15.1 | 18.5 |

TABLE 13

Average fuel consumption for different diesel generator brands using the reference normal commercial diesel and the indirectly-ionized diesel where the directly-ionized diesel is used after four years storage.

| Number | Diesel generator brand | Year of production | Reference fuel consumption (L/kW) | mixed fuel consumption (L/kW) | Fuel saving percentage (%) |
|---|---|---|---|---|---|
| 1 | Marquis | 2005 | 0.44 | 0.33 | 0.25 |
| 2 | epsilon | 2007 | 0.45 | 0.36 | 0.2 |
| 3 | United power | 2006 | 0.39 | 0.29 | 0.25641 |

The results obtained using this test shows that the directly-ionized diesel preserve its features after four years of storage, and it is not affected by the storage period by any means.

Example 5

Commercial Jordanian diesel was electrostatically treated in the treatment vessel for 3 days according to according to the parallel flow configuration. The used sensors are the inline conductivity, viscosity, and density sensors. The operating conditions for the production of the directly ionized diesel in phase 1 are given in table 14. This treatment process took place in April 2010.

TABLE 14 operating conditions for the production of the directly ionized diesel in phase I.

| Number | Operating parameter | Operating value | Operating unit |
|---|---|---|---|
| 1 | Treatment vessel pressure | 1 | bar |
| 2 | Circulation line pressure | 3 | bar |
| 3 | Treatment vessel temperature | 50 | C.° |
| 4 | Circulation flow rate | 5 | Liter/hour |
| 5 | Tank volume | 100 | Liter |
| 6 | Tank initial level at starting day | 100 | Liter |
| 7 | Circulation duty cycle | Continuous on | 100% |
| 8 | Bypass fluid percentage | 50% | % |

We have measured some of the physical quantities related to the directly ionized diesel at different testing dates starting from the date of production till January 2014 to trace the changes of the physical parameters of the directly ionized diesel.

For the conductivity measurements, MLA900 conductivity sensor (with a measurement range 0-2000 ps/m) was used to measure the conductivity of the mixed or indirectly-ionized that was produced according to different mixing concentrations between the directly ionized diesel and the normal commercial Jordanian diesel. The results shown in table 15 makes it clear that the directly ionized diesel maintain and preserve its conductivity features versus time.

TABLE 15 conductivity measurements of the mixed or indirectly-ionized diesel using the top and bottom mixing configurations at different mixing ratios for two different testing dates.

| | Testing Date = Apr. 15, 2010 | | Testing Date = Jan. 20, 2014 | |
|---|---|---|---|---|
| Mixing concentration | Top mixing Conductivity ps/m at T = 25 C.° | bottom mixing Conductivity ps/m at T = 25 C.° | Top mixing Conductivity ps/m at T = 25 C.° | bottom mixing Conductivity ps/m at T = 25 C.° |
| 5.00E−01 | Out of range | Out of range | Out of range | Out of range |
| 2.50E−01 | Out of range | Out of range | Out of range | Out of range |
| 1.25E−01 | Out of range | Out of range | Out of range | Out of range |
| 6.25E−02 | 1190 | 1356 | 1176 | 1380 |
| 3.13E−02 | 691 | 781 | 689 | 790 |
| 1.56E−02 | 355 | 420 | 359 | 431 |
| 7.81E−03 | 224 | 268 | 219 | 275 |
| 3.91E−03 | 181 | 183 | 178 | 188 |
| 1.95E−03 | 144 | 133 | 149 | 137 |
| 9.77E−04 | 134 | 160 | 130 | 166 |
| 4.88E−04 | 135 | 134 | 128 | 138 |
| 2.44E−04 | 123 | 124 | 125 | 127 |
| 1.22E−04 | 135 | 136 | 137 | 140 |
| 6.10E−05 | 123 | 145 | 125 | 149 |
| 3.05E−05 | 149 | 127 | 139 | 131 |
| 1.53E−05 | 141 | 118 | 135 | 125 |
| 7.63E−06 | 146 | 122 | 140 | 122 |
| 3.81E−06 | 118 | 150 | 115 | 155 |
| 1.91E−06 | 136 | 145 | 130 | 149 |

Regarding the dynamic viscosity and density measurements of the directly ionized diesel, these two variables were measured every 6 months starting from april-2010 at two different temperatures. The results shown in table 16 shows a stability of the measurement process over me.

TABLE 16 dynamic viscosity and density measurements of the directly ionized diesel at different testing dates and at two different temperatures.

| Testing Date | Dynamic viscosity at T = 20 C.° | density at T = 20 C.° | Dynamic viscosity at T = 50 C.° | density at T = 50 C.° |
|---|---|---|---|---|
| Apr. 15, 2010 | 7.5043 | 0.8566 | 4.1727 | 0.8362 |
| Oct. 15, 2010 | 7.5044 | 0.8565 | 4.1726 | 0.8361 |
| Apr. 15, 2011 | 7.5045 | 0.8567 | 4.1725 | 0.8363 |
| Oct. 15, 2011 | 7.5043 | 0.8566 | 4.1725 | 0.8363 |
| Apr. 15, 2012 | 7.5044 | 0.8566 | 4.1726 | 0.8362 |
| Oct. 15, 2012 | 7.5044 | 0.8567 | 4.1727 | 0.8361 |
| Apr. 15, 2013 | 7.5045 | 0.8565 | 4.1725 | 0.8361 |
| Oct. 15, 2013 | 7.5043 | 0.8566 | 4.1727 | 0.8362 |

To confirm the fact that the directly ionized diesel preserves its features over time, the directly ionized diesel is used as an ionizing agent or ionizer for the normal commercial Jordanian gasoline. The directly ionized diesel is mixed according to the top mixing configuration with the normal commercial Jordanian gasoline with a mixing ratio of 100 ppm (0.1 ml of directly ionized diesel is mixed with 1 liter of normal commercial Jordanian gasoline) where the normal commercial Jordanian gasoline is added at the bottom of the mixing vessel, and the directly ionized diesel is added at its top.

The resultant mixed or indirectly-ionized gasoline is then used as the gasoline fuel for different vehicles that operates on gasoline 90 grade. The average fuel consumption for the vehicles using the reference normal commercial gasoline, and the resultant mixed or indirectly-ionized gasoline are shown in table 17. The vehicle routes, speeds, and other conditions are kept under the same operating conditions. This testing process took place in February 2014.

TABLE 17

Average mileage for different vehicle brands using the reference normal commercial gasoline, and the resultant mixed gasoline.

| Number | Vehicle brand | Year of production | Reference fuel mileage (km/L) | two-stage mixed fuel mileage (km/L) | Fuel saving percentage (%) |
|---|---|---|---|---|---|
| 1 | Nissan-Sunny | 2008 | 15.3 | 17.8 | 16.3 |
| 2 | Hyundai-Accent | 2005 | 16.1 | 19 | 18.0 |
| 3 | Chevrolet-Aveo | 2013 | 14.6 | 16.1 | 10.3 |
| 4 | Kia-Sportage | 2012 | 11.5 | 12.6 | 9.6 |
| 5 | Mercedes-E200 | 2010 | 10.9 | 12.6 | 15.6 |

The results obtained using this test shows that the directly-ionized fluid can have a different chemical composition from the reference normal without affecting the functionality and the purpose of treatment.

In accordance with the present invention, the applications might include, but not limited to, all applications of the direct magnetic/electrostatic/electromagnetic treatment of fluids such as water treatment for plant growth improvement, water treatment for scaling prevention, water treatment for salinity reduction, water treatment for health aspects, water treatment for construction, fuel (diesel, gasoline, jet fuel, fuel oil, crude oil, etc.) treatment for combustion efficiency improvement and exhaust emission reductions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A method for electromagnetic treatment of fluids comprising three spatially and temporally decoupled phases, the method comprising:
   a treatment phase in which directly-ionized fluid is produced by applying a direct electromagnetic field to a non-ionized fluid while the non-ionized fluid is in circulation according to a treatment method;
   a mixing phase in which an indirectly-ionized fluid is produced by mixing the directly-ionized fluid with the non-ionized fluid according to a predetermined mixing ratio and a mixing method; and
   a usage phase in which the indirectly-ionized fluid produced in the mixing phase is used immediately in a proper application or is stored or transported for later use,
   wherein if the indirectly ionized fluid produced in the mixing phase is stored, at least one of a quality, property, and feature of the stored indirectly ionized fluid is totally preserved.

2. The method according to claim 1, further comprising:
   providing a first fluid tank containing a non-ionized fluid;
   providing a second fluid tank containing a directly-ionized fluid, wherein the second directly-ionized fluid is produced by applying a direct electromagnetic field to the first non-ionized fluid while the fluid is in circulation;
   providing a treatment unit configured to apply the electromagnetic field to the fluid in the second fluid tank;
   providing a circulation pump for circulating the fluid in the second fluid tank under an influence of the electromagnetic field generated from the treatment unit;
   providing a proportional valve for controlling a flow rate of the fluid in the second fluid tank;
   providing a circulation conduit comprising a first conduit connecting the second fluid tank with the treatment unit; a second conduit connecting the treatment unit with the second fluid tank; and a third conduit connecting first fluid tank with the second fluid tank;
   providing a plurality of actuators and sensors for controlling operating conditions of the fluid in the second fluid tank and the circulation conduit;
   providing a plurality of sensors capable of detecting changes in physical and chemical properties of the fluid in the second fluid tank; and
   providing an optional mixer for mixing the fluid in the second fluid tank.

3. The method according to claim 2, wherein the treatment unit comprises a permanent magnet setup for applying a magnetic field, an electrostatic setup for applying the electrostatic field, or an electromagnetic setup for applying the electromagnetic field.

4. The method according to claim 2, wherein the plurality of sensors for detecting the changes in the physical and chemical properties of the fluid in the second fluid tank are placed at a position such that the sensor is capable of detecting changes in physical and chemical properties of the fluid before the treatment unit and after the treatment unit.

5. The method according to claim 2, wherein the plurality of sensors for detecting the changes in the physical and chemical properties of the fluid in the second fluid tank are provided in an interior of the second fluid tank.

6. The method according to claim 2, wherein the plurality of actuators and sensors for controlling the operating conditions of the fluid in the second fluid tank are in direct connection with the second fluid tank and the circulation conduit.

7. The method according to claim 2, wherein a totality of the fluid in the second fluid tank is capable of passing through the treatment unit without any bypass conduit.

8. The method according to claim 2, wherein a fraction of the fluid in the second tank is capable of passing through the treatment unit and the remaining fraction is capable of passing through a bypass conduit.

9. The method according to claim 1, further comprising:
   providing a volume of a first non-ionized fluid to a second fluid tank;
   applying a direct electromagnetic field to the first non-ionized fluid;
   circulating the non-ionized fluid in the second fluid tank through a treatment unit that outputs its flow back to the second fluid tank for a controlled time and/or controlled flow rate, with optional intermittent circulation cycles, to produce a second directly ionized fluid;
   measuring properties of the second directly ionized fluid in the second fluid tank using at least one sensor to obtain at least one measurement;
   adjusting operating conditions of the second directly ionized fluid in the second fluid tank based on the obtained measurement; and
   optionally performing mixing process of the second directly ionized fluid in the second fluid tank using a mixer or a mixing pump according to a controlled mixing duty cycle.

10. The method according to claim 9, wherein a totality of the fluid in the second fluid tank is passing through the treatment unit without any bypass conduit.

11. The method according to claim 9, wherein a fraction of the fluid in the second fluid tank is passing through the treatment unit and the remaining fraction is passing through a bypass conduit.

12. The method according to claim 9, wherein the applying of the direct electromagnetic fields on the directly ionized fluid within the treatment unit is carried out while the fluid is under controlled circulation environments.

13. The method according to claim 9, wherein the at least one sensor is configured to control at least one from among temperature, pressure, flow rate, circulation duty cycle, mixing duty cycles, level and volume of the fluid in the second tank.

14. The method according to claim 13, wherein the flow rate and the circulation duty cycle of the directly ionized fluid are fluid and application dependent.

15. The method according to claim 9, wherein controlled variables are tuned and controlled according to certain desired values that have a constant or a variable time profile based on feedback of at least one sensor.

16. The method according to claim 1, further comprising performing a mixing step between the non-ionized fluid and the directly ionized fluid produced in the treatment phase, the mixing step comprising:
providing a first fluid tank containing a first non-ionized fluid;
providing a second fluid tank containing a second directly ionized fluid;
providing a third fluid tank containing a third indirectly ionized fluid, wherein the third indirectly ionized fluid is produced by mixing the second directly ionized fluid with the first non-ionized fluid;
providing a first proportional valve for controlling a flow rate of the first non-ionized fluid;
providing a second proportional valve for controlling a flow rate of the second directly ionized fluid;
providing a plurality of actuators and sensors for controlling the mixing conditions of the third indirectly ionized fluid in the third fluid tank;
providing a first conduit connecting the first fluid tank with the third fluid tank; and
providing a second conduit connecting the second fluid tank with the third fluid tank.

17. The method according to claim 16 adapted such that the directly ionized fluid and the non-ionized fluid are mixed in the third fluid tank.

18. The method according to claim 16 adapted such that the directly ionized fluid and the non-ionized fluid are mixed in the conduit connecting the first and second fluid tanks with the third fluid tank.

19. The method according to claim 1, further comprising performing a mixing step between the non-ionized fluid and the directly ionized fluid produced in the treatment phase, the mixing step comprising:
providing a first fluid tank containing a first non-ionized fluid;
providing a second fluid tank containing a second directly ionized fluid;
providing a third fluid tank containing a third indirectly ionized fluid, wherein the third indirectly ionized fluid is produced by mixing the second directly ionized fluid with the first non-ionized fluid;
providing a first conduit connecting the first fluid tank with the second fluid tank;
providing a second conduit connecting the second fluid tank with the third fluid tank;
providing a proportional valve for controlling a flow rate of the first non-ionized fluid; and
providing a plurality of actuators and sensors for controlling the mixing conditions of the third indirectly ionized fluid in the third fluid tank.

20. The method according to claim 19 adapted such that the directly ionized fluid and the non-ionized fluid are mixed in the second fluid tank.

21. The method according to claim 19 adapted such that the directly ionized fluid and the non-ionized fluid are mixed in a plurality of tanks connected in series.

22. The method according to claim 19 adapted such that the directly ionized fluid and the non-ionized fluid are mixed in a plurality of tanks.

23. The method according to claim 1 comprising a step of mixing a directly ionized fluid produced in the treatment phase and a non-ionized fluid in accordance with a predetermined mixing ratio to generate an indirectly ionized fluid wherein the indirectly ionized fluid is ionized indirectly from the directly ionized fluid.

24. The method according to claim 1, wherein the directly ionized fluid produced in the treatment phase is used as an ionizer or an ionizing agent for ionizing the non-ionized fluid.

25. The method according to claim 1, wherein the indirectly-ionized fluid is not subjected to any direct electromagnetic treatment.

26. The method according to claim 1, wherein the mixing ratio between the directly ionized fluid produced in the treatment phase and the non-ionized fluid is application dependent and fluid dependent.

27. The method according to claim 1, further comprising performing a mixing step between the non-ionized fluid and the directly ionized fluid produced in the treatment phase, the mixing step comprising:
providing a first vessel for receiving a first non-ionized fluid;
providing a second vessel for receiving a second directly ionized fluid; and
providing a third vessel for receiving a third indirectly-ionized fluid that is in fluidic connection with the first and second vessels for simultaneously receiving a first controlled flow of the first non-ionized fluid and a second controlled flow of the second directly ionized fluid.

28. The method according to claim 1, further comprising performing a mixing step between the non-ionized fluid and the directly ionized fluid produced in the treatment phase, the mixing step comprising:
providing a first vessel for receiving a first non-ionized fluid;
providing a second smaller vessel for receiving a second directly ionized fluid; and
providing a third vessel for receiving a third indirectly-ionized fluid, where the second small vessel receives a controlled flow of the first non-ionized fluid from the first vessel and outputs a flow of third indirectly-ionized fluid for the third vessel comprising the first non-ionized fluid and the second directly ionized fluid.

29. The method according to claim 1, further comprising performing a mixing step between the non-ionized fluid and the directly ionized fluid produced in the treatment phase, the mixing step comprising:
providing a first vessel for receiving a first non-ionized fluid;
providing a plurality of smaller vessels that are connected in series for receiving the second directly ionized fluid, and
providing a third vessel for receiving a third indirectly-ionized fluid, where a first smaller vessel receives a controlled flow of the first non-ionized fluid from the first vessel and the plurality of smaller vessels output a flow of third indirectly-ionized fluid for the third fluid vessel.

30. The method according to claim 1, wherein a first fluid comprises the non-ionized fluid that does not pass through any direct electromagnetic field, a second fluid comprises the directly ionized fluid that undergoes direct electromagnetic treatment in the treatment phase, and a third indirectly-ionized fluid, resulting from the mixing process between the first non-ionized fluid and the second directly ionized fluid in the mixing phase, is ionized or treated indirectly from the second directly ionized fluid, and the third indirectly-ionized fluid becomes totally treated.

31. The method according to claim 1, wherein the directly ionized fluid produced in the treatment phase and the indirectly-ionized fluid produced in the mixing phase can be used immediately in the proper application or can be stored for later use.

32. The method according to claim 1, wherein the production of the directly ionized fluid is spatially and temporally decoupled from the production of the indirectly ionized fluid.

33. The method according to claim 1, wherein treatment plants used in the treatment phase are not in the same location as mixing plants used in the mixing phase.

34. The method according to claim 1, wherein the indirectly-ionized fluid has better characteristics than the directly ionized fluid and the non-ionized fluid whenever used in the application if properly mixed according to an optimal mixing ratio and mixing procedure.

35. The method according to claim 1, wherein the indirectly ionized fluid produced in the mixing phase can be used as an ionizer or ionizing agent for the non-ionized fluid for more than one time depending on the mixing ratio and mixing procedure between the non-ionized fluid and the directly ionized fluid produced in the treatment phase.

36. The method according to claim 1, wherein the directly ionized fluid and the non-ionized fluid used in the mixing phase can be of similar chemical composition or have a different chemical composition.

37. A method for electromagnetic treatment of fluids comprising three spatially and temporally decoupled phases, the method comprising:
a treatment phase in which directly-ionized fluid is produced by applying a direct electromagnetic field to a non-ionized fluid while the non-ionized fluid is in circulation according to a treatment method;
a mixing phase in which an indirectly-ionized fluid is produced by mixing the directly-ionized fluid with the non-ionized fluid according to a predetermined mixing ratio and a mixing method; and
a usage phase in which the indirectly-ionized fluid produced in the mixing phase is used immediately in a proper application or is stored or transported for later use,
wherein the mixing method comprises:
depositing the directly ionized fluid produced in the treatment phase in a bottom of a mixing vessel; and
depositing the non-ionized fluid on a top of the directly ionized fluid.

38. A method for electromagnetic treatment of fluids comprising three spatially and temporally decoupled phases, the method comprising:
a treatment phase in which directly-ionized fluid is produced by applying a direct electromagnetic field to a non-ionized fluid while the non-ionized fluid is in circulation according to a treatment method;
a mixing phase in which an indirectly-ionized fluid is produced by mixing the directly-ionized fluid with the non-ionized fluid according to a predetermined mixing ratio and a mixing method; and
a usage phase in which the indirectly-ionized fluid produced in the mixing phase is used immediately in a proper application or is stored or transported for later use,
wherein the mixing method comprises:
depositing the non-ionized fluid in a bottom of a mixing vessel;
depositing the directly ionized fluid on a top of the non-ionized fluid.

* * * * *